(12) United States Patent
Wright

(10) Patent No.: US 12,048,273 B2
(45) Date of Patent: Jul. 30, 2024

(54) METHODS FOR CULTIVATING *SPHAGNUM*

(71) Applicant: Micropropagation Services (E.M.) Limited, East Leake (GB)

(72) Inventor: Neal Wright, East Leake (GB)

(73) Assignee: Micropropagation Services (E.M.) Limited, Loughborough (GB)

( * ) Notice: Subject to any disclaimer, the term of this patent is extended or adjusted under 35 U.S.C. 154(b) by 0 days.

(21) Appl. No.: 17/612,826

(22) PCT Filed: May 22, 2020

(86) PCT No.: PCT/GB2020/051252
§ 371 (c)(1),
(2) Date: Nov. 19, 2021

(87) PCT Pub. No.: WO2020/234607
PCT Pub. Date: Nov. 26, 2020

(65) Prior Publication Data
US 2022/0217926 A1    Jul. 14, 2022

(30) Foreign Application Priority Data
May 22, 2019 (GB) .................................. 1907229

(51) Int. Cl.
*A01G 22/30* (2018.01)
*A01G 25/16* (2006.01)

(52) U.S. Cl.
CPC ............ *A01G 22/30* (2018.02); *A01G 25/16* (2013.01)

(58) Field of Classification Search
CPC ......... A01G 22/30; A01G 25/16; A01G 25/26
See application file for complete search history.

(56) References Cited

U.S. PATENT DOCUMENTS

| 4,744,515 A | 5/1988 | Watanabe |
| 8,862,276 B2 | 10/2014 | Schmidt et al. |

FOREIGN PATENT DOCUMENTS

| CN | 104303760 A | 1/2015 |
| CN | 104322247 A | 2/2015 |
| CN | 106358890 A | 2/2017 |
| CN | 106576722 A | 4/2017 |
| CN | 106768166 A | 5/2017 |
| CN | 109232034 A | 1/2019 |
| CN | 109526292 A | 3/2019 |

(Continued)

OTHER PUBLICATIONS

Wichmann et al. "Establishing Sphagnum cultures on bog grassland, cut-over bogs, and floating mats: procedures, costs and area potential in Germany," Mires and Peat, vol. 20 (2017/18) Article 3 (19 pages).*

(Continued)

*Primary Examiner* — Susan McCormick Ewoldt
(74) *Attorney, Agent, or Firm* — MacMillan, Sobanski & Todd, LLC

(57) ABSTRACT

The invention provides a method for cultivating *Sphagnum* that has been applied to a surface of a field, the method comprising controllably irrigating the *Sphagnum*, wherein the controllably irrigating comprises applying water to a surface of the *Sphagnum* and/or to the surface of the field. The invention also relates to *Sphagnum* obtainable by a method of the invention.

20 Claims, 12 Drawing Sheets

(56) References Cited

FOREIGN PATENT DOCUMENTS

| | | |
|---|---|---|
| JP | 2004208651 A | 7/2004 |
| JP | 2016202109 A | 12/2016 |

OTHER PUBLICATIONS

Gaudig et al. "Sphagnum farming from species selection to the production of growing media: a review," Mires and Peat, vol. 20 (2017/18), Article 13, 1-30.* https://bogology.org/2013/09/27/sphagnum-moss-bog-plant-extraordinaire/—Retrieved from the Internet on Mar. 20, 2023 (4 pages total).*

Price, J. "Soil moisture, water tension, and water table relationships in a managed cutover bog," Journal of Hydrology 202 (1997) pp. 21-32.*

Wichmann et al., "Establishing Sphagnum cultures on bog grassland, cut-over bogs, and floating mats: procedures, costs and area potential in Germany", Mires and Peat, 2017, vol. 20, Article 03, pp. 1-19.

European Communication pursuant to Rule 114(2) EPC, Third party observations under Art. 115 EPC, Application No. 20734796.4, dated Mar. 2, 2023.

Gaudig et al., "Sphagnum farming from species selection to the production of growing media: a review", Mires and Peat, (2017), vol. 20, Article 13, pp. 1-30.

Krebs et al., "Record growth of Sphagnum papillosum in Georgia (*Transcaucasus*): rain frequency, temperature and microhabitat as key drivers in natural bogs", Mires and Peat, (2016), vol. 18, Article 04, pp. 1-16.

Brust et al., "The water balance of a Sphagnum farming site in north-west Germany", Mires and Peat, (2017), vol. 20, Article 10, pp. 1-12.

Robroek et al., "Interactive effects of water table and precipitation on net CO2 assimilation of three co-occuring Sphagnum mosses differing in distribution above the water table", Global Change Biology, (2009), vol. 15, pp. 680-691.

PCT International Search Report and Written Opinion, Application No. PCT/GB2020/051252, dated Sep. 10, 2020.

Intellectual Property Office Combined Search and Examination Report under Section 17 and 18(3), Application No. GB1907229.7, dated Jul. 15, 2019.

\* cited by examiner

METHODS FOR CULTIVATING *SPHAGNUM*

The present invention relates to *Sphagnum* and methods for cultivating the same.

*Sphagnum* is a genus of moss. It is a lower plant, or a non-vascular plant, and is an example of a bryophyte. It is often referred to as peat moss and typically grows in the wild in peatlands or wetlands. Examples of suitable habitats for *Sphagnum* include bogs, such as raised bogs and blanket bogs, moors, mires, and fens. *Sphagnum* has a particularly high capacity for maintaining water in its hyaline cells. As such, in its natural environment, *Sphagnum* typically grows in wet conditions.

Peatlands around the world are formed when lower layers of *Sphagnum* decay to form peat, while the upper layer continues to grow on the surface. As a result of this, carbon is stored within the peat while the actively-growing upper *Sphagnum* continues sequestering carbon dioxide from the atmosphere. Peatlands cover approximately 3% of the land on the Earth's surface, but store over 500 Gigatonnes of carbon—more than all other vegetation types combined. However, due to adverse impacts on the peatlands (e.g. industrial pollution, drainage—particularly for agriculture, and peat harvesting) the actively-growing upper *Sphagnum* has been eroded (or is now absent) in many peatlands, thereby exposing the peat to the atmosphere. This absence of surface *Sphagnum* enables carbon to be released from the peatland. This is a pressing environmental issue, and damaged peatlands now contribute around 6% of global anthropogenic carbon dioxide emissions. As a result, there is a pressing need for effective peatland restoration and methods of sustainably growing *Sphagnum* for restoration purposes. Current methods of peatland restoration typically involve translocating *Sphagnum* from other sites including peatlands, which is clearly not sustainable. Moreover, peat is also used as horticultural growing media. As this peat is harvested from the wild, this damages peatlands and ultimately exacerbates carbon emissions.

Paludiculture techniques have typically been used to grow *Sphagnum* and are believed to be essential to achieve optimal growth. Such techniques involve reproducing growth conditions in the wild by growing *Sphagnum* in a peat bog or bog grassland and irrigating to raise and maintain a high water table at the site. Typically, this is achieved by forming banks and using blocking ditches, and then filling the ditches with water and optionally additionally using underground pipes to irrigate and saturate the soil to raise the water table. Typically, the water table may be raised up to a position around 5-15 cm below the surface of the field. It is difficult to maintain precise levels of the water table, and if the water table drops, water supply relies on capillary action which is inefficient over large distances. An example setup for conventional *Sphagnum* farming is described in more detail in reference to FIGS. 1-3.

Conventional methods of *Sphagnum* farming have numerous disadvantages, including the use of significant amounts of water to raise the water table. The water applied to the area by way of the underground pipes is in excess and not used by the *Sphagnum* for growth. Thus, the conventional methods waste water. The excess water used may cause damage to surrounding areas/problems with adjoining areas, including crop flooding; this is especially the case where adjacent areas are desired to be kept drained. The use of ditches filled with water also leads to significant evaporation and associated methane release, which can be damaging to the environment.

Moreover, the conventional methods are also expensive and complex to implement, typically requiring the construction of ditches, banks, and underground piping. Typically, around 30-50 cm of a top layer (e.g. soil) of the surface of the site is removed to remove layers that have been agriculturally cultivated. Additionally, sites must also be levelled precisely. This process reduces the suitability of many sites. To form the necessary banks and ditches to raise the water table, approximately 50% of the site area is required. This reduces the available area for a productive crop of *Sphagnum* to approximately 50%. The cost involved to prepare such a site is also large, costing over £10,000 per hectare. Furthermore, there are access complications associated with water-logged sites. For example, it is difficult to apply *Sphagnum* to such soft ground, and is often applied by hand as machinery cannot easily be used. Furthermore, harvesting can only be achieved using the banks for access. This may be performed by specialist equipment such as using an excavator with a particularly long reach. Erosion of the banks may further complicate this issue. Additionally, harvesting such a crop as *Sphagnum* with high water content creates a very heavy product which is difficult to transport.

The present invention overcomes one or more of the above-mentioned problems.

In one broad aspect the invention provides a method for cultivating *Sphagnum* comprising the use of controllable irrigation, optionally wherein the *Sphagnum* and/or the medium on which the *Sphagnum* is growing is controllably irrigated.

The present inventors have developed a method for cultivating *Sphagnum* that has been applied to a surface of a field, the method comprising controllable irrigation, which comprises applying water to a surface of the *Sphagnum* and/or to the surface of the field. Surprisingly, the inventors have found that the methods of the invention result in improved *Sphagnum* growth, such as improved *Sphagnum* yields (per area) and/or improved growth rates when compared to conventional irrigation techniques.

Thus, in one aspect the invention provides a method for cultivating *Sphagnum* that has been applied to a surface of a field, the method comprising controllably irrigating the *Sphagnum*, wherein the controllably irrigating comprises applying water to a surface of the *Sphagnum* and/or to the surface of the field.

Preferably the invention provides a method for cultivating *Sphagnum* that has been applied to a surface of a field, the method comprising controllably irrigating the *Sphagnum*, wherein the controllably irrigating comprises applying water to a surface of the *Sphagnum*.

In one aspect the invention provides a method for cultivating *Sphagnum* that has been applied to a growth surface, the method comprising controllably irrigating the *Sphagnum*, wherein the controllably irrigating comprises applying water to a surface of the *Sphagnum* and/or to the growth surface.

In some examples, applying *Sphagnum* to a surface of the field may mean planting the *Sphagnum* in the field.

Advantageously, the invention provides a method for growing *Sphagnum* that does not require the provision of banks, ditches, and/or underground pipes to ensure saturation of the ground and raising of the water table. In some embodiments, the field does not comprise a bank, ditch and/or underground pipe (preferably bank, ditch, and underground pipe), e.g. a bank, ditch and/or underground pipe configured to supply water to the *Sphagnum*, for example by raising the water table.

Moreover, the methods of the invention are more economical/less wasteful as less water is required when compared to conventional paludiculture methods.

In one embodiment the controllable irrigation of the invention does not comprise saturating the field with water to submerge at least a portion of the *Sphagnum* with water. For example the method may not comprise submerging more than 60%, 50%, 40%, 30%, 20%, 10% or 5% of a surface area of *Sphagnum* with water (preferably no more than 2%, more preferably 0%). For example the method may not comprise submerging more than 60%, 50%, 40%, 30%, 20%, 10% or 5% of a surface area of a growing portion of *Sphagnum* with water (preferably no more than 2%, more preferably 0%). Without wishing to be bound by theory, the present inventors believe that the methods of the invention apply water in a manner such that it is more accessible to the *Sphagnum* (preferably the growing portions thereof) while at the same time allowing improved gas exchange between the *Sphagnum* (preferably the growing portions thereof) and the air by ensuring that the *Sphagnum* is not submerged and saturated with water. Preferably, therefore, the controllable irrigation does not comprise saturating the field with water to submerge a growing portion of the *Sphagnum* with water.

In some embodiments the field has a water table and the controllable irrigation of the invention does not increase a level of the water table, e.g. increasing a level of the water table such that at least a portion of the *Sphagnum* (preferably a growing portion) is submerged with water. It is surprising that good growth can occur without raising the water table, as it is established theory in the art that optimal growth rates can only be obtained by raising the water table using conventional paludiculture techniques and that *Sphagnum* only grows in the wild where high water tables are maintained.

In another aspect, the invention provides a method for cultivating *Sphagnum*, the method comprising:
  a. growing *Sphagnum* in a field, wherein the field has a water table; and
  b. controllably irrigating to facilitate growth of the *Sphagnum*;
    wherein the controllably irrigating does not change a level of the water table.

In a related aspect, the invention provides *Sphagnum* obtainable by a method of the invention.

The term "obtainable" as used herein also encompasses the term "obtained". In one embodiment the term "obtainable" means obtained.

In some embodiments the methods herein may be considered non-paludiculture methods. The term "non-paludiculture method" as used herein means that the method does not employ paludiculture. In this respect, in some embodiments, the methods of the invention are more closely related to agricultural or horticultural techniques for growing other plants and/or crops. Paludiculture is a wet agriculture technique that employs wet (saturated) soils to cultivate a plant or crop, wherein water tables are at or near to the surface of the field. In one embodiment paludiculture comprises wetting a field to increase the level of the water table, e.g. such that *Sphagnum* in said field is partially or wholly submerged. Thus, in the present invention, the level of the water table is preferably not such that the *Sphagnum* is partially or wholly submerged. In some embodiments, the methods of the invention do not comprise re-wetting a field (or a peatland).

The methods of the invention comprise cultivating *Sphagnum*. Cultivating *Sphagnum* encompasses maintaining the *Sphagnum* in a live state. Preferably, the term "cultivating" as used herein refers to promoting growth of the *Sphagnum*. Preferably, the methods of the invention comprise growing *Sphagnum*.

The methods of the invention preferably comprise cultivating *Sphagnum* that has been applied to a surface of a field. The term "field" as used herein refers to any suitable area of land in which the *Sphagnum* of the invention can be cultivated or grown. The term "field" encompasses any such area of land, including enclosed, covered or uncovered land. In one embodiment, the field may be a site previously used for agricultural purposes, such as for the growth of crops or for livestock. In another embodiment the field is a moor. Preferably, the "surface of the field" is a peat, soil, or sand surface, more preferably a peat surface. The surface of the field is the uppermost surface of the field, for example exposed to the air (before *Sphagnum* is applied). Preferably, the surface of the field does not include a mat (e.g. capillary floatable matting) or a fleece. In some embodiments, the surface of the field may be a peat surface applied over the field (e.g. over a concrete or other surface), however in some embodiments the presence of a concrete or other surface may preferably be excluded. In some such embodiments, the field may be covered, for example with a polytunnel or greenhouse.

Any suitable *Sphagnum* species (or preferably a combination thereof) may be used in the present invention. As different species of *Sphagnum* may have different growth requirements, the *Sphagnum* species for use in the invention may be selected depending on the environment of the field.

In one embodiment, the invention comprises the use of one or more *Sphagnum* species. Any species could be used, but in one embodiment the invention comprises the use of one or more *Sphagnum* species selected from the group consisting of: *Sphagnum angustifolium, Sphagnum australe, Sphagnum capillifolium, Sphagnum central, Sphagnum compactum, Sphagnum cuspidatum, Sphagnum denticulatum, Sphagnum fallax, Sphagnum fimbriatum, Sphagnum fuscum, Sphagnum imbricatum (austinii), Sphagnum inundatum, Sphagnum magellanicum (medium), Sphagnum palustre, Sphagnum papillosum, Sphagnum pulcrum, Sphagnum russowii, Sphagnum squarrosum, Sphagnum subnitens, Sphagnum tenellum*, and *Sphagnum cristatum*. In one embodiment the method comprises the use of one or more *Sphagnum* species selected from the group consisting of: *Sphagnum palustre, Sphagnum capillifolium, Sphagnum capillifolium rubellum, Sphagnum subnitens, Sphagnum denticulatum, Sphagnum squarrosum, Sphagnum fallax, Sphagnum fimbriatum, Sphagnum cuspidatum, Sphagnum magellanicum*, and *Sphagnum papillosum*. In one embodiment, the invention comprises the use of one or more *Sphagnum* species selected from the group consisting of: *Sphagnum palustre, Sphagnum capillifolium, Sphagnum capillifolium rubellum, Sphagnum subnitens, Sphagnum squarrosum, Sphagnum magellanicum*, and *Sphagnum papillosum*.

In one embodiment a *Sphagnum* species for use in the invention may be one or more selected from the group consisting of: *Sphagnum palustre, Sphagnum capillifolium, Sphagnum fallax, Sphagnum magellanicum, Sphagnum papillosum*, and *Sphagnum squarrosum*.

Most preferably the *Sphagnum* species is *Sphagnum palustre*. For example, *Sphagnum palustre* may be preferable for use in a growing medium because of its physical properties.

It is also envisaged that the invention could be applied to any hybrid *Sphagnum* species.

In one embodiment a method of the invention comprises the use of at least 2, 3, 4, 5 or more *Sphagnum* species. In such embodiments, the different species may be present at different parts of a field.

Preferably, the *Sphagnum* does not include mosses which in some cases are colloquially referred to as *Sphagnum* but are not "true" *Sphagnum*. In other words, the term *Sphagnum* refers to the genus *Sphagnum* and does not include mosses which are not part of the genus *Sphagnum*. For example, preferably the *Sphagnum* does not include *Flatbergium sericeum*, which has been classified as not a species of *Sphagnum*. In other examples, preferably the *Sphagnum* does not include *Ambuchanania leucobryoides* or *Eosphagnum inretortum*, both of the order Sphagnales, but not of the genus *Sphagnum*.

*Sphagnum* has significantly different growth requirements to many plants, including other mosses, and grows primarily in wet conditions such as on peatlands. For example, *Sphagnum* would not be suitable for growing on a bare rock face or a wall, unlike other mosses.

In one embodiment *Sphagnum* for use in a method of the present invention has been grown in vitro, e.g. using tissue culture techniques known in the art. In one embodiment *Sphagnum* for use in a method of the invention is micropropagated *Sphagnum*. Said *Sphagnum* for use in the invention may have been grown in the presence of a nutrient/nutrient composition described herein.

In one embodiment a method of the invention comprises applying *Sphagnum* to the surface of a field. The *Sphagnum* applied can be in any suitable form.

In one embodiment *Sphagnum* (e.g. grown in a greenhouse) may be transplanted to the field. In one embodiment a hummock comprising *Sphagnum* strands is grown (e.g. in a greenhouse) in a soil or peat and then transplanted to the field. In a preferred embodiment a method of the invention comprises the use of BeadaHumok™, which is commercially available from BeadaMoss®, UK.

In some embodiments a field in which *Sphagnum* is grown, in accordance with the invention, comprises a water table.

The term "water table" as used herein refers to an upper surface of a zone of saturation in the field; the zone of saturation being a region where the pores and fractures of the subsurface of the field are saturated with water. In other words, the term "water table" refers to an upper surface of subsurface materials in a field that are saturated at a given vicinity in the field. The water table may vary naturally due to seasonal changes, such as precipitation and/or evapotranspiration.

The "water table" is usually presented as a depth below the surface of a field. The surface of the field is the upper surface below the *Sphagnum*. This may be the upper surface of soil or peat below the *Sphagnum*.

The water table of the field may be at least 30, 35, 40, 45, 50, 55, 60, 65, 70, 75, 80, 85, 90, 95 or 100 cm below the surface of the field. In one embodiment the water table is at least 50 cm below the surface of the field, such as at least 75 cm below the surface of the field. Preferably the water table is at least 1 metre below the surface of the field. Preferably the water table is at a distance below the surface of the field to provide access onto the field, e.g. using machinery.

The term "water table" as used herein is distinct to the term "perched water table", which is an area of saturation that occurs above (at a shallower depth from the surface of the field) the "water table" and which is separated from the "water table" by an area of non-saturation. The controllable irrigation of the invention may result in the formation of a perched water table, e.g. temporarily upon irrigation. For example, the method of the invention may form a layer of water within the *Sphagnum*, which may be regarded as a perched water table. In some embodiments, the non-saturated portion of the field between the water table and a perched water table has a depth of at least 25 cm, at least 50 cm or at least 1 metre.

However, it is preferable that the controllable irrigation of the invention does not form a perched water table (i.e. does not saturate with water a portion of the field that is above the water table), for example to minimise water wastage.

In a preferred embodiment water applied during a controllable irrigation step of a method of the invention does not contribute to the water table. In other words, in some embodiments the water applied during the controllable irrigation of the method does not form/become part of the water table, e.g. by filtering through the field and meeting the water table. In some embodiments less than 10% or 5% of the water applied during the controllable irrigation of the method forms/becomes part of the water table, preferably less than 1%, most preferably 0%.

In some embodiments, the controllable irrigation of the invention may reduce/prevent evaporation of water from a field and thus indirectly affect the level of a water table of said field.

In one embodiment, the controllable irrigation step of a method of the invention does not change the level of the water table; preferably the controllable irrigation step of the invention does not increase the level of the water table. That is, the controllable irrigation comprises applying water to provide a water supply for growth of the *Sphagnum* rather than applying water to raise the water table. In particular, the controllable irrigation is preferably independent of the water table. The term "does not change the level of the water table" as used herein may mean that the controllable irrigation does not substantially change the level of the water table. Said irrigation may change the level by less than 5%, 2%, 1% or 0.5%, preferably less than 0.1%. More preferably, the term "does not change the level of the water table" as used herein means that the controllable irrigation does not change the level of the water table at all (i.e. the change in the level is 0%). In one embodiment, the controllable irrigation does not change the level of the water table by more than 20 cm, 15 cm, 10 cm or 5 cm. Preferably, the controllable irrigation does not change the level of the water table by more than 2 cm.

The methods of the invention do not exclude a change in the level of the water table occurring by other means, such as natural phenomena including rainfall and the like, including the natural flow of water from surrounding areas/flooding. In some embodiments the field may be shielded from precipitation (e.g. rainfall) to minimise any changes to the water table by said precipitation.

In some embodiments, the controllable irrigation does not saturate with water a portion of the field that is above the water table of the field. In some embodiments, the controllable irrigation does not saturate with water a portion of the field that is below the surface of the field. For example, less than 75% of the field above the water table is saturated with water, preferably less than 50%, more preferably less than 25%. For example, the controllable irrigation does not saturate a portion below the surface of the field having a height of, for example, at least 1 cm, preferably at least 5 cm, more preferably at least 10 cm, still more preferably at least 20 cm, even still more preferably at least 30 cm, yet still more preferably at least 40 cm, most preferably at least 50 cm. For example, the controllable irrigation does not saturate a portion below the surface of the field that is within 1 cm of the water table, preferably within 5 cm, more preferably within 10 cm, still more preferably within 20 cm, even still more preferably within 30 cm, yet still more preferably within 40 cm, most preferably a within 50 cm of the water table.

The term "controllably irrigating" as used herein refers to artificial irrigation, rather than natural irrigation (e.g. by precipitation), wherein one or more irrigation parameters are controlled. The irrigation parameters may be one or more of (preferably all of) the amount of water applied, the rate at which water is applied, the location at which the water is applied, the timing of irrigation or the frequency of irrigation. In one embodiment, the controllably irrigating comprises applying water at an amount of 2.6 l/m$^2$ whenever the *Sphagnum* surface is observed to be dry. For example, water may be applied when the growing portion of the *Sphagnum* is observed to be dry, preferably when the capitula of the *Sphagnum* is observed to be dry. For example, irrigation is applied at least once a week, preferably at least twice a week, more preferably at least three times a week, most preferably every day (i.e. 7 times a week). In some embodiments, the controllably irrigating comprises applying water at an amount of 0.5-5 l/m$^2$, for example applied at least once a week, preferably every day. Preferably, the controllably irrigating comprises applying water at an amount of 2-3 l/m$^2$, for example applied at least once a week, preferably every day. In some embodiments, a total amount of water applied is 3.5-35 l/m$^2$ per week, preferably 14-21 l/m$^2$ per week, most preferably 18.2 l/m$^2$ per week. For example, the water can be applied at different times over the week. In some embodiments, this amount of water per m$^2$ per week is an average amount. In other words, in some embodiments, the water does not need applying every week so long as the average amount per m$^2$ per week indicated is supplied. Preferably, the amount of water per m$^2$ per week is applied at least once per week. As used herein, "at least once per week" preferably means at least once in a week (i.e. at least one time in a seven-day period). More preferably, the amount of water per m$^2$ per week is applied at least once weekly.

Where the *Sphagnum* is irrigated at a time interval indicated herein (e.g. per day, week, etc.), it is not necessarily intended that the *Sphagnum* is irrigated at that time interval indefinitely. Preferably, the time interval applies to irrigation of *Sphagnum* during the growing season. In one embodiment *Sphagnum* may be irrigated at a given time interval (e.g. per day, week, etc.) for a period of up to 1, 2, 3, 4, 5, 6, 7, 8 or 9 months (e.g. in a particular year).

The skilled person will appreciate that the "growing season" can be determined based on the geographical location in which the method is being carried out. This will typically be the period of the year when crops and other plants grow successfully. In the northern hemisphere for outdoor growth this is typically April to October. However, when growing in e.g. a glasshouse the growing season may be all year round (e.g. when heated to at least 15° C.).

In one embodiment the method (e.g. controllable irrigation thereof) further comprises the addition of one or more nutrient/nutrient composition (e.g. as described herein). For example, Hortifeeds 15-5-15 may be used in a method of the invention, which is commercially available from Hortifeeds, UK.

The controllably irrigating is achieved using controllable irrigation. The controllable irrigation may be achieved using any means known in the art. In one embodiment, the controllable irrigation comprises applying water to the *Sphagnum* from above the *Sphagnum*. In a preferred embodiment, the controllable irrigation comprises overhead irrigation configured to apply water to the *Sphagnum* from above. The controllable irrigation may be spray irrigation, drip irrigation or a combination thereof.

Spray irrigation may comprise the use of a sprayer or sprinkler device. A spray irrigation system may be positioned such that the irrigation is applied from above the *Sphagnum*. For example, on a small scale, the spray irrigation system may comprise static sprinkler devices arranged at regular intervals across the surface of the field. On a larger scale, the spray irrigation system may comprise a mobile device, such as a mobile gantry movable over the field. Mobile spray irrigation systems or overhead spray irrigation systems, such as those used in agriculture, may be used. This may require less infrastructure than static irrigation systems. Spray irrigation may provide direct irrigation of the *Sphagnum*, and may mimic rainfall, which has the advantage of applying water directly to a surface of the *Sphagnum*, and preferably to a growing portion of the *Sphagnum*.

Drip irrigation may comprise the use of pipes to supply water to emitters positioned along the pipes. The emitters may drip water onto the surface of the *Sphagnum* (e.g. a surface-exposed portion of the *Sphagnum* or a surface within the body of *Sphagnum*) and/or the field, for example at regularly spaced intervals along the pipes, e.g. adjacent to growing *Sphagnum*.

In some embodiments, a combination of spray irrigation and drip irrigation may be used. For example, both types of irrigation may be used at the same time. In other embodiments, different types of irrigation may be used at different times, for example at different growth stages of the *Sphagnum*.

Preferably the controllable irrigation is spray irrigation.

The method (and thus controllable irrigation) may be carried out for a period of at least 12 or preferably at least 24 hours. The method (and thus controllable irrigation) may also be carried out for a period of at least 1, 2 or preferably at least 3 days. In one embodiment the method (and thus controllable irrigation) is carried out for a period of at least 1, 2 or preferably at least 3 weeks. In another embodiment the method (and thus controllable irrigation) is carried out for a period of at least 1, 2, 3, 4, 5 or preferably at least 6 months. In another embodiment the method (and thus controllable irrigation) is carried out for a period of at least 1, 2, 3, 4, 5, or more years. In one embodiment during said period the controllable irrigation does not comprise saturating the field with water to submerge at least a portion of the *Sphagnum* with water. In one embodiment during said period the controllable irrigation does not change the level of the water table. The skilled person will understand that when carrying out the irrigation for the stated period it is not necessary that water is being applied to the *Sphagnum* and/or field continually during said period. In fact, it is advantageous that this is not the case in order to control the amount of irrigation and reduce water wastage.

In some embodiments the method is carried out during the growing season. In one embodiment the method may be carried out for a period of up to 1, 2, 3, 4, 5, 6, 7, 8 or 9 months (e.g. in a particular year).

The methods of the invention may comprise controllably irrigating wherein the controllably irrigating comprises applying water to a surface of the *Sphagnum* and/or to the surface of the field. In one embodiment, the irrigating may comprise applying water to a surface of the field (e.g. a surface of the field below or adjacent to the *Sphagnum*). In such embodiments, an irrigation system may be arranged to apply water to the surface of the field (e.g. only to the surface of the field). The water may then be absorbed by the *Sphagnum*, e.g. by capillary action.

In one preferred embodiment irrigating comprises applying water (directly) to a surface of *Sphagnum*, e.g. a surface-exposed region of *Sphagnum*. Thus, an irrigation system may be arranged to apply water to a surface of *Sphagnum*. Preferably a method of the invention comprises applying water only to a surface of the *Sphagnum*. The inventors have found that by applying water to a surface of the *Sphagnum*, optimum irrigation can be achieved. Advantageously, water uptake by the *Sphagnum* is improved as there is a reduced reliance upon capillary action. Preferably, the controllably irrigating does not comprise applying water below the surface of the field. Thus, water can be saved by preventing waste, while sufficient water can be applied to facilitate optimal growth.

In a particularly preferred embodiment the controllable irrigation comprises applying water to a growing portion of *Sphagnum*.

The term "growing portion" as used herein in reference to *Sphagnum* refers to any portion of *Sphagnum* that is capable of growth. In one embodiment a "growing portion" of *Sphagnum* may be evident by comparison to another "non-growing portion" of *Sphagnum*. The "growing portion" is preferably a portion that is capable of actively photosynthesising, e.g. photosynthesising at the time that the method (and/or controllable irrigation thereof) takes place. Preferably, the growing portion is an actively photosynthesising portion of the *Sphagnum*. In one embodiment a "growing portion" of *Sphagnum* may be determined by the presence of chlorophyll (compared to a non-growing portion in which chlorophyll may be absent or substantially absent). Thus, in one embodiment a "growing portion" may be green due to present/high concentrations of chlorophyll, while a "non-growing portion" may be white or brown due to absent/low concentrations of chlorophyll. In one embodiment, a growing portion may comprise (or consist of) a light-exposed portion of *Sphagnum*. In one embodiment the growing portion is the uppermost part of each strand of *Sphagnum*, e.g. comprises the apex of the *Sphagnum*. In some embodiments, the growing portion comprises (or consist of) a portion that is up to 10 or 15 cm from the end (e.g. uppermost part in normal growth) of each strand of *Sphagnum*. Preferably the growing portion comprises (or consist of) a portion that is up to 5 cm from the end (e.g. uppermost part in normal growth) of each strand of *Sphagnum*.

It is to be understood that applying water to the growing portion of the *Sphagnum* includes where the growing portion is not actually growing at the time of application of water. For example, at night the growing portion may not be photosynthesising. In this case, the method may be carried out in accordance with the invention where the *Sphagnum* may be irrigated at night and the *Sphagnum* is not photosynthesising at the same time. However, over the duration in which the method is performed, at some points the growing portion is actively photosynthesising, such as in between irrigation phases.

In one embodiment a "growing portion" of *Sphagnum* is a visible surface of the *Sphagnum*. In such embodiments the method the controllable irrigation comprises applying water to the visible surface of the *Sphagnum*.

In a preferred embodiment a growing portion of *Sphagnum* comprises a portion where new shoots or branches are budding/growing. Said portion may be adjacent to the capitula. In one embodiment a growing portion may comprise (or consist of) the capitula of the *Sphagnum* and a portion where new shoots or branches are budding/growing. In such embodiments the controllable irrigation comprises applying water to the capitula of the *Sphagnum* and to a portion adjacent thereto (e.g. a portion where new shoots or branches are budding/growing).

Preferably, the growing portion comprises capitula of the *Sphagnum*. More preferably, the growing portion consists of capitula of the *Sphagnum*. Most preferably, the growing portion is the capitula of the *Sphagnum*. In such embodiments the controllable irrigation comprises applying water to the capitula of the *Sphagnum*.

In one embodiment capitula are clusters of young branches present at the top of the *Sphagnum* plants in normal growth.

By applying water directly to the growing portion of the *Sphagnum*, water can be provided where it is required by the *Sphagnum*, rather than relying on capillary action.

In some embodiments, the controllable irrigation comprises applying water to the growing portion of the *Sphagnum* to hydrate the growing portion of the *Sphagnum*. As used herein, "hydrate" may mean to apply sufficient water to promote growth, for example for optimum growth. That is, enough water is applied to the *Sphagnum* to allow growth and prevent the *Sphagnum* drying out. Preferably, the growing portion is prevented from drying out. More preferably, the capitulum is prevented from drying out.

In some embodiments, the method or controllably irrigating ensures that at least a portion of the surface of the *Sphagnum* remains in contact with air in order to permit gaseous exchange. For example the method or controllably irrigating may ensure that at least 40%, 50%, 60%, 70% or 80% of a surface area of *Sphagnum* remains in contact with air in order to permit gaseous exchange (preferably at least 90% or 95%). In some embodiments, the controllably irrigating ensures that at least a portion of a surface of the growing portion of the *Sphagnum* remains in contact with air in order to permit gaseous exchange. In some embodiments, the controllable irrigation comprises applying water to the growing portion of the *Sphagnum* such that at least a part of a surface of the growing portion of the *Sphagnum* remains in contact with air to promote gaseous exchange. For example the method or controllably irrigating may ensure that at least 40%, 50%, 60%, 70% or 80% of a surface area of the growing portion of *Sphagnum* remains in contact with air in order to permit gaseous exchange (preferably at least 90% or 95%, most preferably 100%). For example, at least 10% of the surface of the growing portion remains in contact with air, preferably at least 20%, more preferably at least 30%, yet more preferably at least 40%, most preferably at least 50%. Enabling contact with air permits optimal gas exchange for growth. Thus in one embodiment, water is applied such that the entire surface of the growing portion of the *Sphagnum* is not covered with water which would reduce gaseous exchange. In other words, the growing portion may not be submerged in water. In some examples, providing at least part of the surface in contact with air does not encompass situations where contact with air is removed naturally, such as in sudden flooding.

In some embodiments, spaces between the *Sphagnum* or within the *Sphagnum* are at least partially filled with air. Preferably, the controllable irrigation does not expel all of this air such that not all of the spaces are filled with water. In contrast, in paludiculture techniques where the *Sphagnum* is submerged, the spaces are often filled with water. Therefore, preferably "a surface of the growing portion of the *Sphagnum* remains in contact with air" means that the *Sphagnum* is not submerged with water.

Preferably, the controllable irrigation comprises applying water to the growing portion of the *Sphagnum* to hydrate the growing portion of the *Sphagnum* and such that at least a part of a surface of the growing portion of the *Sphagnum* remains in contact with air to promote gaseous exchange. This provides an optimum amount of water to cultivate the *Sphagnum*.

In some embodiments, the controllably irrigating partially saturates the *Sphagnum* with water. Preferably, the controllable irrigation comprises applying water up to a point at which the *Sphagnum* is saturated with water but not applying additional water beyond the amount required to reach the point of saturation (e.g. not oversaturating the *Sphagnum*). In some embodiments, the controllably irrigating maintains partial saturation of the *Sphagnum* with water for a defined period, e.g. for at least 1 day, 1 week, 1 month, 6 months, 1 year, 5 years or more. As used herein "partial saturation" refers to less than full saturation (i.e. 100% saturation). In some embodiments, partial saturation is less than 100% saturation, preferably less than 90% saturation, more preferably less than 80% saturation, still more preferably less than 70% saturation, even still more preferably less than 60% saturation, and yet even still more preferably less than 50% saturation. Saturation, or full saturation, is a state where the *Sphagnum* can hold no more water. That is, spaces between surfaces of the *Sphagnum* or within the layers of *Sphagnum* are substantially filled with water. Saturation can be observed when water run-off occurs when water is applied. Run-off occurs where water can no longer be absorbed by the *Sphagnum* (due to the *Sphagnum* being fully saturated), and results in water running off the *Sphagnum* and onto the surface of the field, for example. By watering to run-off, saturation of the *Sphagnum* can be determined. As a result, partial saturation can be achieved by stopping applying water before run-off occurs. In one embodiment the irrigating comprises providing sufficient water to the *Sphagnum* such there is little or no run-off. In one embodiment, the controllably irrigating comprises stopping application of water to the surface of the *Sphagnum* once surface run-off of the water is observed and/or wherein the controllably irrigating comprises stopping application of water to the surface of the field once saturation of the field with water is observed.

Preferably, the term "partial saturation" means the *Sphagnum* is not saturated with water to a point where it cannot absorb any additional water. Rather, it means that the *Sphagnum* could hold additional water. However, it has been found to be beneficial to avoid saturation and provide a level of water content below saturation. It is therefore preferable that there is no excess water within the *Sphagnum* that cannot be absorbed, and in particular at the growing portion, as this reduces gaseous exchange.

In one embodiment, the controllably irrigating comprises applying water to the *Sphagnum* such that a ratio of a weight of water to a dry weight of the *Sphagnum* is less than about 60. For example, this corresponds to 60 g of water per 1 g dry weight of *Sphagnum*, for example after harvesting. In other words, the weight of the *Sphagnum* can be measured after harvesting (this wet weight includes the weight of *Sphagnum* and the weight of water held). The *Sphagnum* can then be dried. The *Sphagnum* can be dried by heating until there is no further decrease in weight (i.e. all the water has evaporated). For example, this can be achieved by standard methods of heating at around 110° C. for 24 hours. The difference between the harvest weight and the dry weight provides the weight of water. The ratio disclosed herein is thus the ratio of the weight of water in the harvested *Sphagnum* to the dry weight of the *Sphagnum*.

It has been found that a ratio of a weight of water to a dry weight of the *Sphagnum* of above about 60 causes the *Sphagnum* to be saturated. It has been found that a ratio of a weight of water to a dry weight of the *Sphagnum* of above about 45 is sufficient to substantially saturate the *Sphagnum*. In one embodiment, the controllably irrigating comprises applying water to the *Sphagnum* such that a ratio of a weight of water to a dry weight of the *Sphagnum* is less than about 60, preferably less than 43.80. Results of the water content of *Sphagnum palustre* are presented in Example 4 below.

It is therefore preferable to keep the ratio of the weight of water to the dry weight below about 60 to prevent saturation, preferably less than about 45, more preferably less than 43.80, still more preferably less than about 40, even still more preferably less than about 35, and most preferably less than about 30. Above a ratio of about 35, the water content leads to a reduction in the surface of the *Sphagnum* in contact with air and may reduce the gas exchange in the *Sphagnum*.

It has also been found that a ratio of a weight of water to a dry weight of the *Sphagnum* of less than about 5 may cause the *Sphagnum* to at least partially dry out. It is preferable to keep the ratio above 5 to cultivate the *Sphagnum*. Alternatively or additionally, the controllable irrigation comprises applying water to the *Sphagnum* such that a ratio of a weight of water to a dry weight of the *Sphagnum* is more than about 5, preferably more than about 7, more preferably more than about 8, still more preferably more than about 10, most preferably more than about 12.

Preferably, the ratio of a weight of water to a dry weight of the *Sphagnum* is between about 5 and 60. More preferably, the ratio of a weight of water to a dry weight of the *Sphagnum* is between about 8 and 45. Even more preferably, the ratio of a weight of water to a dry weight of the *Sphagnum* is between about 10 and 40. Still more preferably, the ratio of a weight of water to a dry weight of the *Sphagnum* is between about 12 and 35.

The ratio may also be expressed as X:Y, where X is the weight of water and Y is the dry weight of *Sphagnum*. For example, in one embodiment, a weight of water to a dry weight of the *Sphagnum* are in a ratio of between 5:1 and 60:1. With a ratio of above about 60:1, the *Sphagnum* has been found to become saturated with water which has been found to reduce growth rates, and hence it is preferable to provide a ratio of less 60:1. With a ratio of below about 5:1, the *Sphagnum* has been found to become dry, and hence it is preferable to provide a ratio of at least 5:1. Preferably, a weight of water to a dry weight of the *Sphagnum* are in a ratio of between 8:1 and 45:1. More preferably, a weight of water to a dry weight of the *Sphagnum* are in a ratio of between 10:1 and 40:1. Even more preferably, a weight of water to a dry weight of the *Sphagnum* are in a ratio of between 12:1 and 35:1. In some embodiments the ratio is less than 35:1. Still more preferably, a weight of water to a dry weight of the *Sphagnum* are in a ratio of between 12:1 and 30:1. Still more preferably, a weight of water to a dry weight of the *Sphagnum* are in a ratio of between 15:1 and 25:1.

In one embodiment, the controllable irrigation comprises applying water to the *Sphagnum* such that a ratio of a weight of water to a dry weight of the *Sphagnum* is between about 5 and about 60. In a preferred embodiment, the controllable irrigation comprises applying water to the *Sphagnum* such that a ratio of a weight of water to a dry weight of the *Sphagnum* is between about 8 and about 45. In a more preferred embodiment, the controllable irrigation comprises applying water to the *Sphagnum* such that a ratio of a weight of water to a dry weight of the *Sphagnum* is between about 10 and about 40. In a most preferred embodiment, the controllable irrigation comprises applying water to the *Sphagnum* such that a ratio of a weight of water to a dry weight of the *Sphagnum* is between about 12 and about 35.

In some embodiments, the ratio of a weight of water held in the growing portion of the *Sphagnum* to a dry weight of the growing portion is between about 5 and 60, preferably between about 8 and 45, more preferably between about 10 and 40, still more preferably between about 12 and 35. In a preferred embodiment, the ratio of a weight of water held in the capitula of the *Sphagnum* to a dry weight of the capitula is between about 5 and 60, preferably between about 8 and 45, more preferably between about 10 and 40, still more preferably between about 12 and 35.

Advantageously, irrigation comprising partial saturation of the *Sphagnum* in accordance with the invention is more economical as it requires less water and/or is more efficient and/or has been found by the inventors to improve growth of the *Sphagnum*. Without wishing to be bound by theory, the inventors believe that by exposing *Sphagnum* to the air rather than submerging it with water (as per conventional paludiculture techniques) gaseous exchange can be improved, meaning that growth rates can be improved. The improved growth rates are described in more detail in Example 2 herein.

In one embodiment the controllable irrigation comprises applying water such that the weight of water to the volume of *Sphagnum* is maintained at least 150 g/L, 200 g/L, 250 g/L, 300 g/L, 350 g/L, 400 g/L or 450 g/L, preferably at least 250 g/L. Alternatively or additionally, the controllable irrigation comprises applying water such that the weight of water to the volume of *Sphagnum* is maintained at 500 g/L or less, 450 g/L or less, 400 g/L or less, 350 g/L or less, 300 g/L or less, 250 g/L or less or 200 g/L or less, preferably 400 g/L or less.

The *Sphagnum* may be saturated by applying water such that the weight of water to the volume of *Sphagnum* is maintained at between about 150 g/L to 500 g/L. This means that every litre of *Sphagnum* growing will contain between about 150 g to 500 g of water.

In one embodiment *Sphagnum* may be saturated by applying water such that the weight of water to the volume of *Sphagnum* is maintained at between about 250 g/L to 400 g/L, preferably at between about 300 g/L to 360 g/L, more preferably about 330 g/L.

The controllable irrigation may be controlled based on an environmental parameter. For example, the environmental parameter may include temperature, precipitation, humidity, wind speed, or other weather condition. In some embodiments, said environmental parameters will likely effect whether or not the *Sphagnum* is saturated with water. Preferably, irrigation is controlled based on evaporation of water from the *Sphagnum* and/or field. In such embodiments the controllable irrigation may comprise the use of a sensor that measures the environmental parameter and adjusts an irrigation parameter accordingly.

In one embodiment, the methods of the invention comprise the use of a sensor that measures evaporation of water. In one embodiment, an irrigation parameter is altered when the evaporation of the water is sensed. Preferably, when the evaporation of water exceeds a pre-set threshold level, an irrigation parameter is altered (e.g. the amount of water applied is increased and/or the rate at which water is applied is increased and/or the irrigation time is increased and/or the frequency of irrigation is increased).

The irrigation system may comprise a processor configured to receive data from a sensor measuring an environmental parameter, thereby allowing control of irrigation based on feedback from the sensor. For example, if a rainfall sensor has measured levels of rainfall that exceed a pre-set threshold level, then it may automatically trigger the irrigation system to reduce the amount of irrigation. In another example, if a temperature sensor has measured temperatures that exceed a pre-set threshold level, then it may automatically trigger the irrigation system to increase the amount of irrigation.

Alternatively or additionally, the controllable irrigation system may receive data over a network such as the internet to obtain rainfall or other weather data, and use this data to control the irrigation instead of using a particular sensor.

In some embodiments, the irrigation may be controlled based on user input. For example, a user may change the amount of irrigation based on recent heavy rainfall, or recent drought. Any of the examples disclosed herein may be performed manually by a user instead of automatically e.g. using sensors.

Advantageously, the present invention allows for the control of the amount of irrigation on a short-term basis, which is not possible using paludiculture techniques and/or those conventional techniques where the water table is raised.

In one embodiment, the methods of the invention also comprise covering the *Sphagnum*. The *Sphagnum* may be covered with any suitable material. A cover can reduce water loss by evaporation and enhance growth by protecting the *Sphagnum* from the wind and retaining warmth. A cover can therefore provide a microclimate for the *Sphagnum*. In some embodiments the covering material may be a mesh cover, a plastic cover or a straw cover. Advantageously, growth of *Sphagnum* has been shown to be improved by employing the use of such a cover.

Preferably, the cover can be arranged over the *Sphagnum*. For example, the cover may be arranged at a height of less than 1 m above the *Sphagnum*, e.g. less than 50 cm. By keeping the height of the cover close to the *Sphagnum*, the microclimate can be better maintained to control humidity. A preferred height of the cover is one that allows for the control of humidity without interfering with growth of *Sphagnum*, e.g. by obstructing growth. As such, preferably the cover is placed over but not in contact with the *Sphagnum*.

A cover can protect the *Sphagnum* and prevent weed ingress and seeds blowing onto the *Sphagnum* when it is grown on a field.

In some embodiments, the cover may be a straw cover. For example, straw may be spread over the surface of the *Sphagnum*.

Preferably, the cover is porous to water. In this manner, rainfall can pass through the cover, and irrigation applied from above can drain through the permeable cover to the *Sphagnum*. Preferably, the cover comprises apertures. In some embodiments, the cover is a sheet with apertures to permit airflow and water. For example, the cover may have holes in, or may be formed from a mesh to provide apertures. In one example, the cover is a plastic cover and comprises apertures. In another example, the cover is a mesh cover wherein the woven pattern provides apertures. In other examples, the cover may be made from a material permeable to water, and in some of these cases fewer or no apertures need be provided.

In some embodiments, the cover may be a plastic cover. For example, the plastic cover may be a semi-opaque and/or light absorbent plastic cover. Preferably, the plastic cover is perforated. The perforated plastic cover permits water to pass therethrough to allow for overhead irrigation and rain. In one example, the plastic cover may be permeable to light thereby promoting optimal growth and high light transmission, e.g. in the winter. In another example, the plastic cover may be white to protect from harsh sunlight in the summer.

Most preferably, the cover is a mesh cover. For example, the mesh cover may be a woven mesh cover. For example, the mesh cover may be an insect mesh or netting. Preferably, the mesh cover is robust and does not deteriorate and need replacing after an extended period (e.g. at least 12 months or 18 months). The mesh cover also permits water to pass therethrough to allow for overhead irrigation and rain. Preferably, the cover is a mesh cover of 0.3×0.7 mm 120 g/m$^2$.

It is particularly preferable to use a mesh cover together with spray irrigation.

In one aspect, the invention provides a method for cultivating Sphagnum that has been applied to a surface of a field and covered with a cover as described herein, the method comprising controllably irrigating the Sphagnum. In one embodiment, the method comprises covering the Sphagnum with a cover.

Optionally, the cover is a sheet. For example, a sheet preferably encompasses a plastic cover and a mesh cover, and preferably excludes straw. Optionally, the cover is made from an artificial material.

Preferably, the cover is a plastic cover. More preferably, the cover is a mesh cover. Even more preferably, the cover is a mesh cover of 0.3×0.7 mm 120 g/m$^2$.

Optionally, the controllably irrigating comprises drip irrigation.

In some embodiments, the controllably irrigating comprises applying water to an upper surface of the Sphagnum. Preferably, the controllably irrigating comprises applying water from above the Sphagnum. More preferably, the controllably irrigating comprises spray irrigation. Most preferably, the cover comprises a mesh cover and the controllably irrigation comprises spray irrigation.

Optionally, the controllably irrigating comprises applying water to a surface of the Sphagnum and/or to the surface of the field. Optionally, the controllably irrigating does not saturate the field or the Sphagnum. As will be appreciated, the controllably irrigating may comprise any of the features of the controllable irrigation described herein in relation to other aspects of the invention.

More preferably a woven mesh cover is applied to the Sphagnum. More preferably the method comprises controllably irrigating mesh covered Sphagnum using spray irrigation.

In a preferred embodiment, a woven mesh cover is applied over the Sphagnum. A mesh allows sufficient light to the Sphagnum for growth. The mesh is long-lasting compared to straw and is potentially re-usable. The mesh also prevents weed seeds from blowing in and contaminating the Sphagnum. Differently to most plants, Sphagnum has been found to thrive in a high humidity environment, where providing a cover retains the high humidity which is advantageous. If the cover is perforated, porous, or woven, then water is allowed to be transmitted through the cover, and overhead irrigation e.g. spray irrigation can be suitable.

Using a cover provides a significant increase in the growth of Sphagnum, as discussed in Examples 5 and 7.

In one embodiment a method of the invention further comprises harvesting the Sphagnum. The method of the invention provides a sustainable method of growing Sphagnum in contrast to conventional Sphagnum harvesting methods from the 'wild' that damage environments such as peatlands. A fully-grown carpet of Sphagnum can be lifted and harvested. On a large scale, a forage or silage harvester may be used to lift the carpet or mat of Sphagnum, chop the Sphagnum, and load it. In contrast, in conventional paludiculture techniques, a long-reach excavator fitted with a cutter must be used with access only from the banks. This is very expensive, and is made more difficult by erosion of the banks. Furthermore, partial harvest is difficult and re-establishment is poor with increased weed contamination.

As the Sphagnum is controllably irrigated, the irrigation can be stopped and the Sphagnum can be allowed to dry. The biomass can be dried on site, similar to leaving hay to dry in the summer. This reduces drying costs. The weight of dry Sphagnum can be as low as 7 kg m$^{-3}$ by this method. The harvested Sphagnum has a low moisture content which allows for easier chopping and provides a very light product for transport. This is not possible in conventional Sphagnum farming where the water table is raised. The harvested wet Sphagnum in conventional Sphagnum farming provides a heavy product which is difficult and costly to chop, dry and transport.

After harvest, the area of the field can be re-applied with Sphagnum, for regeneration and another harvest cycle.

In some embodiments the harvested Sphagnum may be applied (e.g. transplanted) to a secondary location, for example planted to a secondary location. The secondary location may be area for restoration, for example a peatland or an agricultural site.

In some embodiments, the methods of the invention further comprise providing a growing medium comprising the harvested Sphagnum. For example, the growing medium may be an agricultural growing medium used as a replacement for compost (e.g. peat-based compost). It is desirable to use Sphagnum as a replacement for peat in growing media, as harvesting peat leads to degradation of peatlands as described herein. As peat is a common component of conventional growing media, replacing this with Sphagnum that can be grown sustainably is beneficial. By growing Sphagnum on a field, a sustainable production of Sphagnum can be achieved without causing considerable damage to peatlands through translocation, and can even allow for multiple harvests. Furthermore, as peat is simply decomposed Sphagnum, Sphagnum itself has many similar and beneficial properties for a component of a growing media as peat. In some examples, a growing medium may comprise Sphagnum in combination with peat.

Aspects of the invention may be provided in conjunction with each other and features of one aspect may be applied to other aspects. Any feature in one aspect of the invention may be applied to other aspects of the invention, in any appropriate combination. It should also be appreciated that particular combinations of the various features described and defined in any aspects of the invention can be implemented and/or supplied and/or used independently. Embodiments related to the method may be applied to the Sphagnum obtainable by the method, and vice versa.

Unless defined otherwise, all technical and scientific terms used herein have the same meaning as commonly understood by one of ordinary skill in the art to which this disclosure belongs.

The headings provided herein are not limitations of the various aspects or embodiments of this disclosure.

Other definitions of terms may appear throughout the specification. Before the exemplary embodiments are described in more detail, it is to be understood that this disclosure is not limited to particular embodiments described, and as such may vary. It is also to be understood that the terminology used herein is for the purpose of describing particular embodiments only, and is not intended to be limiting, since the scope of the present disclosure will be defined only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context clearly dictates otherwise. Thus, for example, reference to "a growth medium" includes a plurality of such growth media and reference to "the growth medium" includes reference to one or more growth media and equivalents thereof known to those skilled in the art, and so forth.

The publications discussed herein are provided solely for their disclosure prior to the filing date of the present application. Nothing herein is to be construed as an admission that such publications constitute prior art to the claims appended hereto.

DESCRIPTION OF THE DRAWINGS

Embodiments of the invention will now be described, by way of example only, with reference to the following Figures and Examples.

FIG. 1 shows a cross-sectional side view of a site 100, for example a peat bog environment such as an area of drained peat bog, peat bog grassland used for agriculture, or cut-over bog. The conventional system relies on raising the water table to a point at or just below the surface and maintaining such a level. Such an environment is often used to replicate the conditions in which *Sphagnum* grows in the wild. The site 100 comprises a central area 102 having a surface 104 on which *Sphagnum* 106 is grown. The site 100 is prepared by digging a ditch 108 positioned on at least one side of the central area 102. On the opposing side of the ditch 108 to the central area 102, the site 100 includes a bank 110. The site 100 also includes an underground pipe 112 comprising at least one outlet along its length. In some examples, the site 100 comprises a plurality of underground pipes 112 arranged between a plurality of ditches 108. In FIG. 1, the underground pipe 112 is arranged between the two ditches 108 such that it is in fluid communication with each ditch 108. *Sphagnum* 106 is then applied to the surface 104 of the central area 102. For example, *Sphagnum* 106 is translocated from another peat bog, and is spread onto the surface 104 by hand. The site 100 has a natural water table 114 below the surface 104 of the site 100. The ditch 108 is provided to hold water which is subsequently pumped into the site 100, as described in more detail below with reference to FIG. 2. The bank 110 provides a barrier for containing water within the ditch 108. Water within the ditch 108 can drain into the ground. The underground pipe 112 is connected to the ditch 108 such that water held in the ditch 108 passes through the underground pipe 112, and under the surface 104. The outlets along the underground pipe 112 are configured to release water underground below the surface 104. In alternative examples, the ditch 108 is configured to directly release water into the ground, and the underground pipe 112 need not be provided. The operation of this system will now be described in more detail with reference to FIG. 2.

FIG. 2 shows a site 200 having the same arrangement in FIG. 1, except where explained below, and the same reference numerals are used to refer to similar features. The ditch 208 is identical to the ditch 108 described above with reference to FIG. 1, except that it has been at least partially filled with water. Water is pumped into the ditch 208 in order to raise the water table 114. The underground pipes 112 are provided underneath the surface 104 to supply water to raise the water table 114. The underground pipes 112 are connected to the ditches 208 to receive water from the filled ditches 208. The underground pipes 112 are configured to release water through the outlets (illustrated as gaps in the lines defining the pipes 112 in FIG. 2) at a position underground to saturate the ground and raise the water table 114. Water may also drain directly from the ditches 208 into the surrounding ground. As water moves from the ditch 208 into the underground pipes 112 and subsequently into the ground, the water level within the ditch 208 will decrease. As such, water must be continually pumped in to the ditches 208 to maintain water within the ditch 208. Additionally, water may evaporate from the surface of the water in the ditch 208, wasting water and requiring further supply of water. This evaporation also leads to release of methane, which is damaging to the environment. The water is pumped in until enough water is supplied to the ground to substantially saturate the surrounding region of the ground to raise the water table 114. To raise the water table 114, the ground immediately above the water table 114 must be saturated with water. If a continuous portion of the ground above the water table 114 is fully saturated, the water table 114 will effectively rise. The arrows 216 show the rising level of the water table 114 (illustrated by a dotted line in FIG. 2). This process is described in with reference to FIG. 3 below. This process requires significant amounts of water.

FIG. 3 shows a site 300 having the same arrangement in FIG. 1 and FIG. 2, except where explained below, and the same reference numerals are used to refer to similar features. The site 300 comprises a raised water table 314 which is raised until it is positioned close to the surface 104. The raised water table 314 is raised relative to the natural water table 114 shown in FIGS. 1 and 2, and is the result of pumping in water to raise the water table, as described above with reference to FIG. 2. The water table 314 is raised to the same level as the surface of the water in the ditches 208. The water in the ditches 208 will drain into the surrounding ground to raise the water table 314, and will continue to do so up to the level of the water in the ditches 208 if water is continually supplied. This has the effect that the water table 314 surrounding the ditches 208 is raised relative to the ground away from the ditches 208. In some cases, the water table 314 between and away from the ditches 208 is lower than close to the ditches 208. As such, the water table 314 is difficult to maintain precisely and can vary along the surface 104. This provides variable water supply to different parts of the *Sphagnum* 106 and leads to inconsistent growth. In some cases, this is supplemented by underground pipes 112 releasing water to saturate the ground. The water table 314 is maintained by supplying water to the underground pipes 112 to saturate the ground. This is achieved by providing the banks 110 around the site 300, and providing ditches 208 between the banks 110 and the central area 102, which are filled with water. The water table 314 is attempted to be maintained at its raised level by maintaining water in the ditches 208 for supply to the underground pipes 112, for example by continually pumping in water, such that the ground of the site 300 up to the water table 314 is kept saturated.

FIG. 4 shows an embodiment of the present invention. The field 400 comprises a surface 404 having a width 418 and a length 420. In contrast to FIGS. 1-3, in the present invention a portion of the top of the surface does not need removing. *Sphagnum* 406 is arranged on the surface 404. In FIG. 4, the surface 404 is a peat surface. FIG. 4 shows *Sphagnum* 406 arranged in clumps, such as small hummocks or plugs which are applied to the surface 404. Over time, as the *Sphagnum* 406 grows, the clumps will merge to form a carpet of *Sphagnum* 406, for example covering the entire surface 404. In alternative embodiments, an entire carpet of *Sphagnum* 406 may be applied initially, covering the entire surface 404. The field 400 has a natural water table (not shown). The field 400 also has a drip irrigation system comprising a plurality of irrigation pipes 422. In some examples, and as illustrated in FIG. 4, the irrigation pipes 422 are arranged on the surface 404. However, in some examples the irrigation pipes 422 may be provided above the surface 404, for example resting on the surface of the *Sphagnum* 406 once a sufficient carpet has formed. Each drip irrigation pipe 422 comprises a plurality of outlets 424 arranged at intervals along the length of the pipe 422. The outlets 424 are configured to emit water from the drip irrigation pipes 422 onto the surface 404 and/or the *Sphagnum* 406. This provides irrigation or watering of the *Sphagnum* 406. In some examples, the drip irrigation pipes 422 can be replaced or supplemented with spray irrigation, as described below in reference to FIG. 5. During operation, water is supplied to the irrigation pipes 422. The water is emitted from the outlets 424 of the irrigation pipes 422 to the surface 404 at the top of the peat surface, which can be absorbed by the *Sphagnum* 406 through capillary action, and/or the water is emitted to the *Sphagnum* 406 directly.

FIG. 5 is an example embodiment of aspects of the present invention. In particular, FIG. 5 shows a system for cultivating *Sphagnum* by controllably irrigating comprising applying water to a surface of the *Sphagnum* and/or a surface of the field. In particular, the irrigating does not raise the water table. FIG. 5 shows a cross-sectional view of the same system for cultivating *Sphagnum* as in FIG. 4. FIG. 5 shows a field 500 having the same arrangement as in FIG. 4, except where explained below, and the same reference numerals are used to refer to similar features. The field 500 comprises a surface 404, identical to the surface 404 in FIG. 4. FIG. 5 is a cross-section showing the width 418 of the field 500. The field 500 comprises *Sphagnum* 506 arranged in rows. As in FIG. 4, in this particular example, the *Sphagnum* 506 is arranged in clumps, although other arrangements are envisaged, as described above. The cross-section in FIG. 5 shows a cross-section of one clump of *Sphagnum* 506 from each row. The clumps of *Sphagnum* 506 are shown as larger than the clumps shown in FIG. 4 simply to denote that FIG. 5 corresponds to a later time than FIG. 4, after the clumps of *Sphagnum* 506 have grown. At a certain point in time, adjacent clumps of *Sphagnum* 506 within each row will merge together and a full carpet of *Sphagnum* 506 will be formed covering the entire surface 404, although this is not shown in FIG. 5. The field 500 also comprises drip irrigation pipes 422, which are identical to the drip irrigation pipes 422 shown in FIG. 4. The drip irrigation pipes 422 are shown arranged in rows, where the cross-section in FIG. 5 shows a cross-section of each pipe 422. The field 500 also has a natural water table 514, which may be similar to the natural water table 114 in FIG. 1. The precise level of the natural water table 514 may be affected by environmental factors such as rainfall. Typically, the natural water table 514 may be arranged between 0.5-5 metres below the surface 404, depending on the field 500. When the method is carried out as described above with reference to FIG. 4, the irrigation pipes 422 supply water to the *Sphagnum* 506. In accordance with an embodiment of the invention, the irrigation pipes 422 are configured to controllably irrigate the *Sphagnum* 506 to apply water to a surface of the *Sphagnum* 506 and/or to the surface 404 of the field. Furthermore, the irrigation does not raise the water table 514. That is, the irrigation does not raise the water table 514, unlike the conventional system shown in FIGS. 1 to 3. The water from the irrigation system does not cause substantial saturation of the ground between the natural water table 514 and the surface 404. That is, a portion of the ground between the natural water table 514 and the surface 404 is not fully saturated. This condition may be maintained throughout the method of growing *Sphagnum* 506. For example, this may be maintained for at least one year. As a result, a portion of the ground above the natural water table 514 will not be saturated. This portion may extend a height above the natural water table 514 of approximately 20-60 cm. For example, at least 20-60 cm of ground between the surface 404 and the natural water table 514 will not be saturated. The height of this portion is variable with time of year, weather conditions, the surrounding landscape and soil type. In some examples, the portion has a height of 5-100 cm.

FIG. 6 is an example embodiment of aspects of the present invention. In particular, FIG. 6 shows a system for cultivating *Sphagnum* by controllably irrigating comprising applying water to a surface of the *Sphagnum* and/or a surface of the field. In particular, the irrigating does not raise the water table, wherein the water table is not changed by the irrigation. FIG. 6 shows a cross-sectional view of a similar system for growing *Sphagnum* as in FIG. 5, but with spray irrigation. FIG. 6 shows a field 600 having the same arrangement as in FIG. 5, except where explained below, and the same reference numerals are used to refer to similar features. The field 600 comprises a surface 404, identical to the surface 404 in FIG. 5. FIG. 6 is a cross-section showing the width 418 of the field 600. The field 600 comprises *Sphagnum* 506 arranged in rows. As in FIG. 6, in this particular example, the *Sphagnum* 506 is arranged in clumps, although other arrangements are envisaged, as described above. The field 600 comprises irrigation, which is spray irrigation 622 in contrast to the drip irrigation 422 shown in FIG. 5. Spray irrigation 622 involves arranging pipes in the same way to the drip irrigation 422 shown in FIG. 4. However, instead of outlets 424 arranged along the length of the pipes for emitting the water, the spray irrigation 622 comprises sprinklers shown in FIG. 6. These sprinklers spray water onto the *Sphagnum* 506 from above. In a similar way to the drip irrigation 422, the spray irrigation 622 does not raise the water table 514. On a larger scale, where growth of *Sphagnum* is more established and there is a full carpet of *Sphagnum*, spray irrigation 622 may involve using a mobile gantry to provide overhead irrigation.

EXAMPLES

Comparative Example 1

Conventional Methods for Cultivating *Sphagnum*

S. Wichmann et al. (2017) *Mires and Peat*, Vol. 20, Article 03, pp. 1-19, describes a conventional method of *Sphagnum* farming using paludiculture, which does not employ controllable irrigation according to the present invention. A first trial on a former bog grassland was performed by Wichmann et al. The trial on bog grassland was performed at Rastede (Lower Saxony, NW Germany) and consisted of two phases: (a) preparing the site; and (b) initiating the *Sphagnum* culture. This involved forming *Sphagnum* production strips, narrow ditches for irrigation around each production strip, and bunds or banks to be used as causeways. 30-50 cm of the layer of top soil was removed using a tracked excavator. Narrow ditches (approximately 50 cm wide and 50 cm deep) were constructed along with bunds, and pumps and underground pipes for irrigation were installed. The *Sphagnum* fragments were spread onto the production strips. The ditches were filled with water and the water table was raised immediately. *Sphagnum papillosum* was the species of *Sphagnum* used.

This method provides a high water table which is raised and maintained by the use of ditches and underground pipes. This achieved productivity levels of 3.25 t $ha^{-1}$ $a^{-1}$ of average annual dry mass harvest, with a bulk density of 30 g $L^{-1}$, which corresponds to 108 $m^3$ $ha^{-1}$ $a^{-1}$. This has been plotted in FIG. 7 ("Former Bog").

A second trial using a floating mat system was performed by Wichmann et al. Buoyant mats supporting *Sphagnum* were floated on a surface of an artificial water body. Floating mats from panels of polystyrene foam (2 cm thick) were wrapped in an absorbent textile (polypropylene fleece) to allow water supply to the *Sphagnum* from underneath. The *Sphagnum* fragments were applied to the surface of the mats and covered with a thin straw mat. *Sphagnum papillosum* was the species of *Sphagnum* used.

Figure 1:
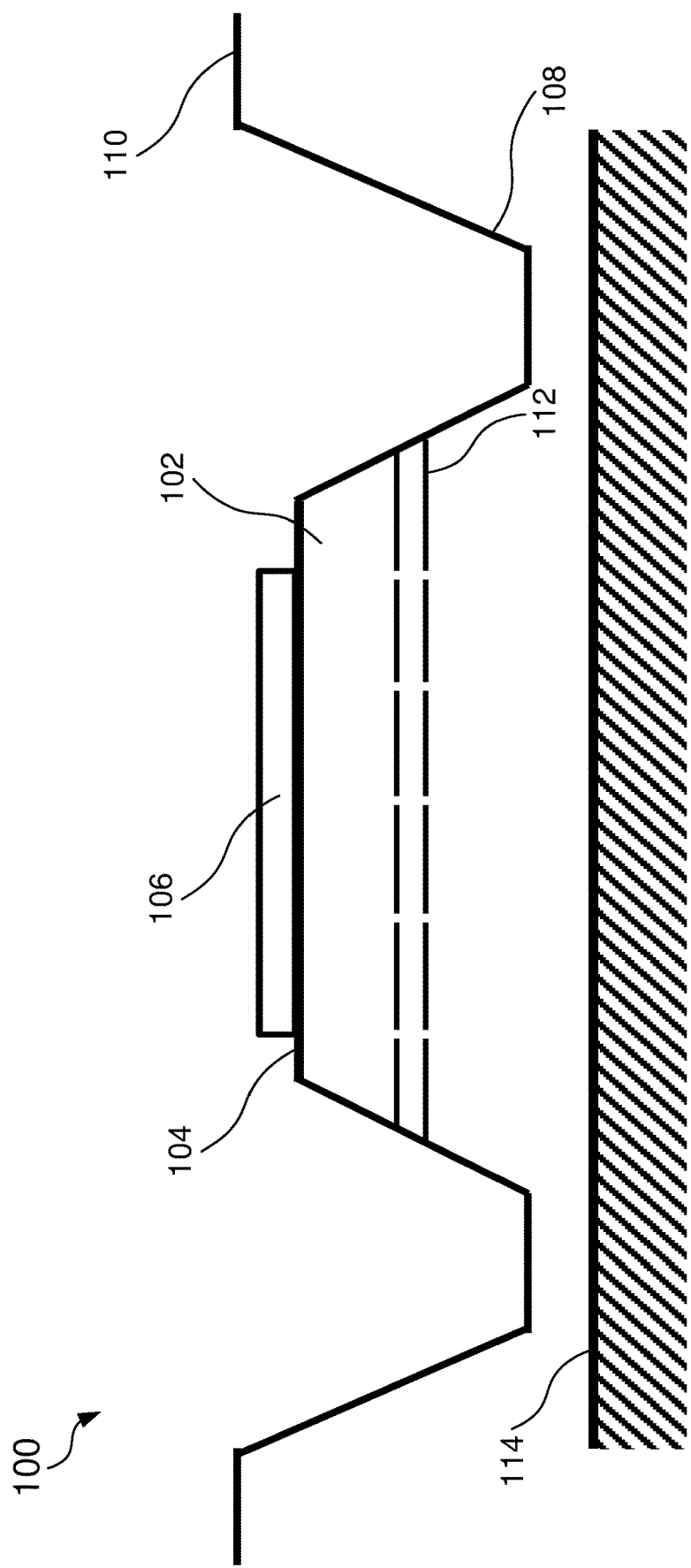
FIG. 1 shows a conventional system for growing *Sphagnum* under paludiculture conditions on a site 100.
Figure 2:
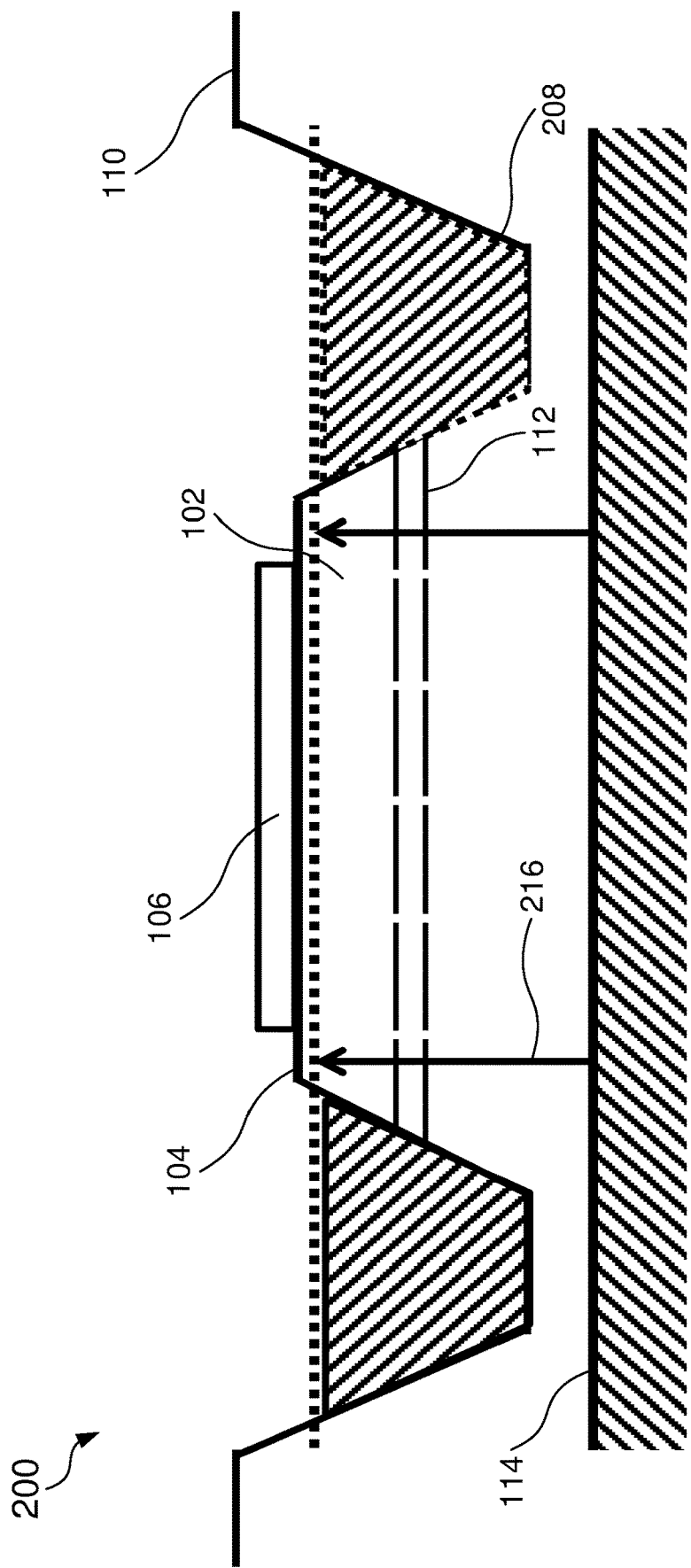
FIG. 2 shows the same conventional system for growing *Sphagnum* under paludiculture conditions as in FIG. 1.
Figure 3:
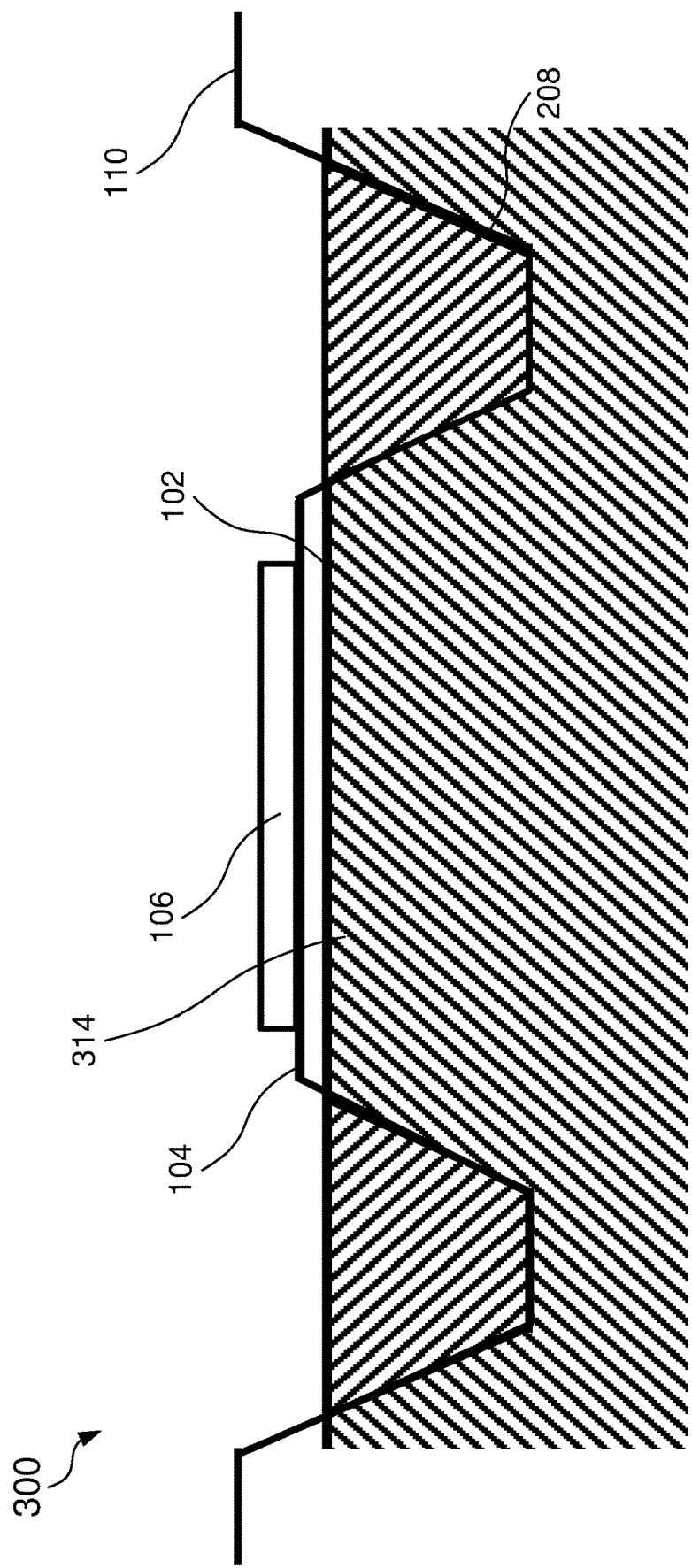
FIG. 3 shows the same conventional system for growing *Sphagnum* under paludiculture conditions as in FIG. 1 and FIG. 2.
Figure 4:
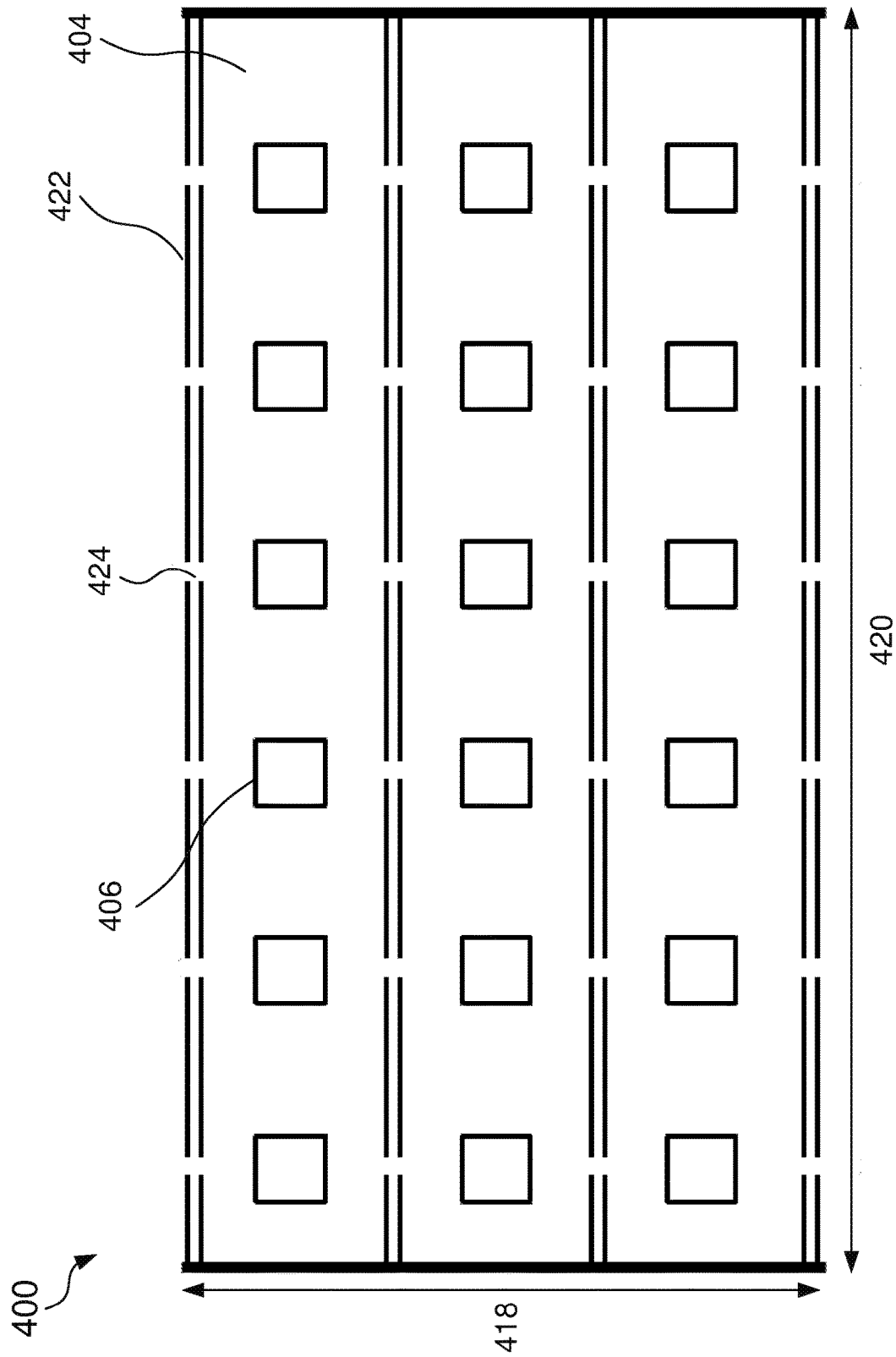
FIG. 4 shows a plan view of an example embodiment of a system for cultivating *Sphagnum* in accordance with the present invention, showing drip irrigation.
Figure 5:
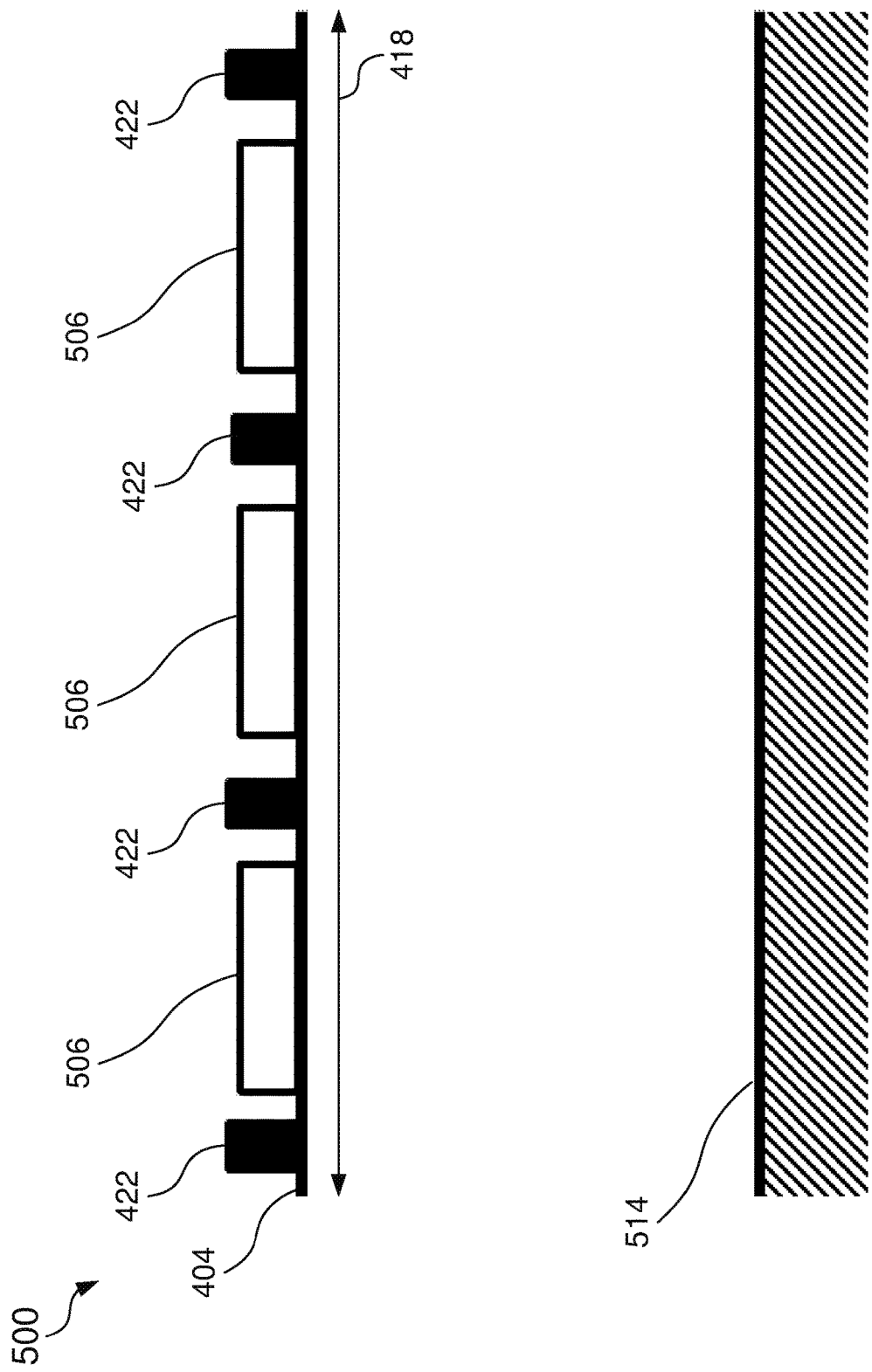
FIG. 5 shows a side view of an example embodiment of a system for cultivating *Sphagnum* in accordance with the present invention, showing drip irrigation.
Figure 6:
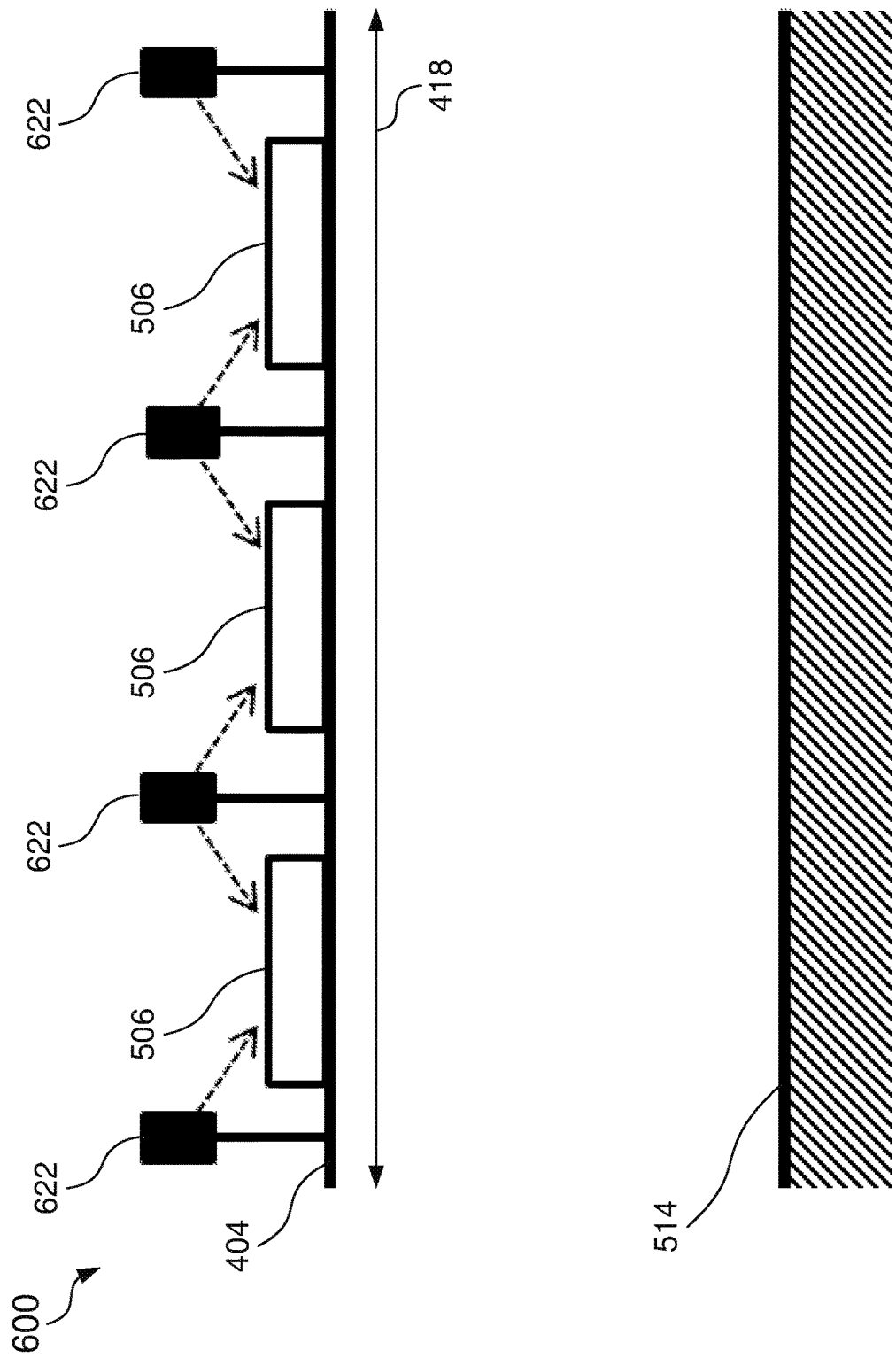
FIG. 6 shows a side view of an example embodiment of a system for growing *Sphagnum* in accordance with the present invention, showing spray irrigation.
Figure 7:
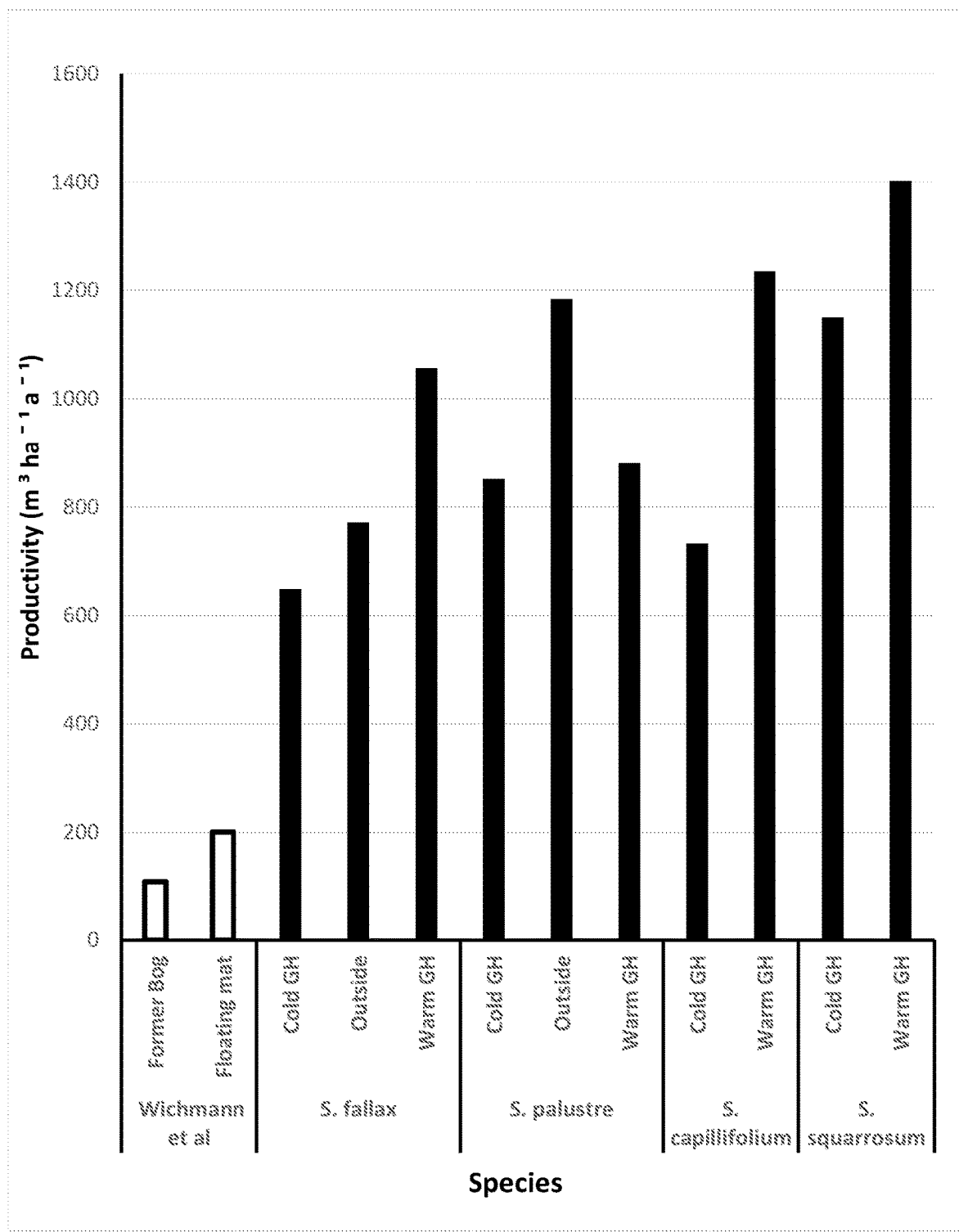
FIG. 7 shows productivity (in $m^3$ $ha^{-1}$ $a^{-1}$; that is cubic metres per hectare per annum) of *Sphagnum* species grown under greenhouse (GH) conditions (cold or warm) or outside, in accordance with the present invention (black bars), compared to productivity grown by conventional paludiculture methods of Wichmann et al. (white bars), as indicated.

This method provides water directly below the surface of the *Sphagnum* by floating on a surface of a body of water. Water is transported to the *Sphagnum* around the mat by capillary action through the textile. This achieved productivity levels of 6 t $ha^{-1}$ $a^{-1}$ of average annual dry mass harvest for floating mats. As the bulk density was also 30 g $L^{-1}$, this corresponds to 200 $m^3$ $ha^{-1}$ $a^1$ and is shown in FIG. 7 ("Floating Mat").

Example 2

Methods for Cultivating *Sphagnum* According to the Invention

Materials & Methods

*Sphagnum* was cultivated in accordance with a method of the present invention. In more detail, BeadaGel™ (commercially available from BeadaMoss®, UK) was spread at 3 $l/m^2$ on a peat surface of a field. Four species were used: *Sphagnum fallax, Sphagnum palustre, Sphagnum capillifolium,* and *Sphagnum squarrosum*. Water was supplied with overhead (spray) irrigation (applied at 2.6 $l/m^2$ whenever the surface of the *Sphagnum* appeared dry). The water contained a nutrient composition comprising Hortifeeds NPK 15-5-15. This gave a final nutrient content comprising: 2.92 mg/L of sodium, 13.17 mg/L of magnesium, 106.50 mg/L of potassium, 36.96 mg/L of calcium, 0.41 mg/L of manganese, 0.09 mg/L of copper, 0.55 mg/L of zinc, 4.30 mg/L of sulfur, 0.19 mg/L of boron, 24.57 mg/L of phosphorus, 0.98 mg/L of iron, 0.05 mg/L of molybdenum, 0.16 mg/L of chloride, 0.00 mg/L of nitrite, 10.36 mg/L of sulphate, 378.62 mg/L of nitrate, and 17.36 mg/L of ammonium. Hortifeeds 15-5-15 is commercially available from Hortifeeds, UK. Growth was carried out for a period of 12 months before harvesting. Once harvested, volume was assessed by using the Growing Media industry standard method: BS EN 12579:2000 "Soil Improvers and Growing Media".

Results

FIG. 7 shows that in comparison to the results of Wichmann et al. *Sphagnum* grown in accordance with the present invention demonstrated productivity levels of approximately 600-1400 $m^3$ $ha^{-1}$ $a^{-1}$. In more detail, the results in FIG. 7 show the results for *Sphagnum* grown using spray irrigation in a warm greenhouse (i.e. heated in winter), a cold greenhouse (i.e. unheated), and outside grown (i.e. in a field—e.g. as per Wichmann et al). Therefore, the results show that the improvement in growth occurs in numerous *Sphagnum* culture conditions.

The results also show the improvement in growth is not limited to one particular species of *Sphagnum* and can be extrapolated across the genus. Improved growth was achieved in the four different species, namely *Sphagnum fallax, Sphagnum palustre, Sphagnum capillifolium*, and *Sphagnum squarrosum*.

Of particular interest is the comparison between the productivity of the *Sphagnum* species in the "Outside" conditions of the present invention and the productivity of

*Sphagnum papillosum* of Wichmann et al ("Former Bog" and "Floating Mat" in FIG. 7). The methods according to the present invention achieved a productivity of 1184 m$^3$ ha$^{-1}$ a$^{-1}$ in comparison to the productivity of 108 m$^3$ ha$^{-1}$ a$^{-1}$ on the former bog and 200 m$^3$ ha$^{-1}$ a$^{-1}$ on the floating mats in Wichmann et al. This provides a significant improvement in growth compared to Wichmann et al.

Example 3

Materials & Methods

*Sphagnum* was cultivated in accordance with a method of the present invention. BeadaGel™ (commercially available from BeadaMoss®, UK) was spread at 3 l/m$^2$ on a peat surface in a glasshouse. Six species were used: *Sphagnum capillifolium, Sphagnum fallax, Sphagnum magellanicum, Sphagnum papillosum, Sphagnum squarrosum*, and *Sphagnum palustre*. The glasshouse was at a minimum temperature of 5° C. and ventilated at 20° C., and water was applied with overhead (spray) irrigation (applied at 2.6 l/m$^2$ whenever the surface of the *Sphagnum* appeared dry). The water contained a nutrient composition comprising Hortifeeds NPK 15-5-15. This gave a final nutrient content comprising: 2.92 mg/L of sodium, 13.17 mg/L of magnesium, 106.50 mg/L of potassium, 36.96 mg/L of calcium, 0.41 mg/L of manganese, 0.09 mg/L of copper, 0.55 mg/L of zinc, 4.30 mg/L of sulfur, 0.19 mg/L of boron, 24.57 mg/L of phosphorus, 0.98 mg/L of iron, 0.05 mg/L of molybdenum, 0.16 mg/L of chloride, 0.00 mg/L of nitrite, 10.36 mg/L of sulphate, 378.62 mg/L of nitrate, and 17.36 mg/L of ammonium. Hortifeeds 15-5-15 is commercially available from Hortifeeds, UK. Growth was carried out for a period of 12 months before harvesting. Once harvested, volume was assessed by using the Growing Media industry standard method: BS EN 12579:2000 "Soil Improvers and Growing Media".

Results

Figure 8:
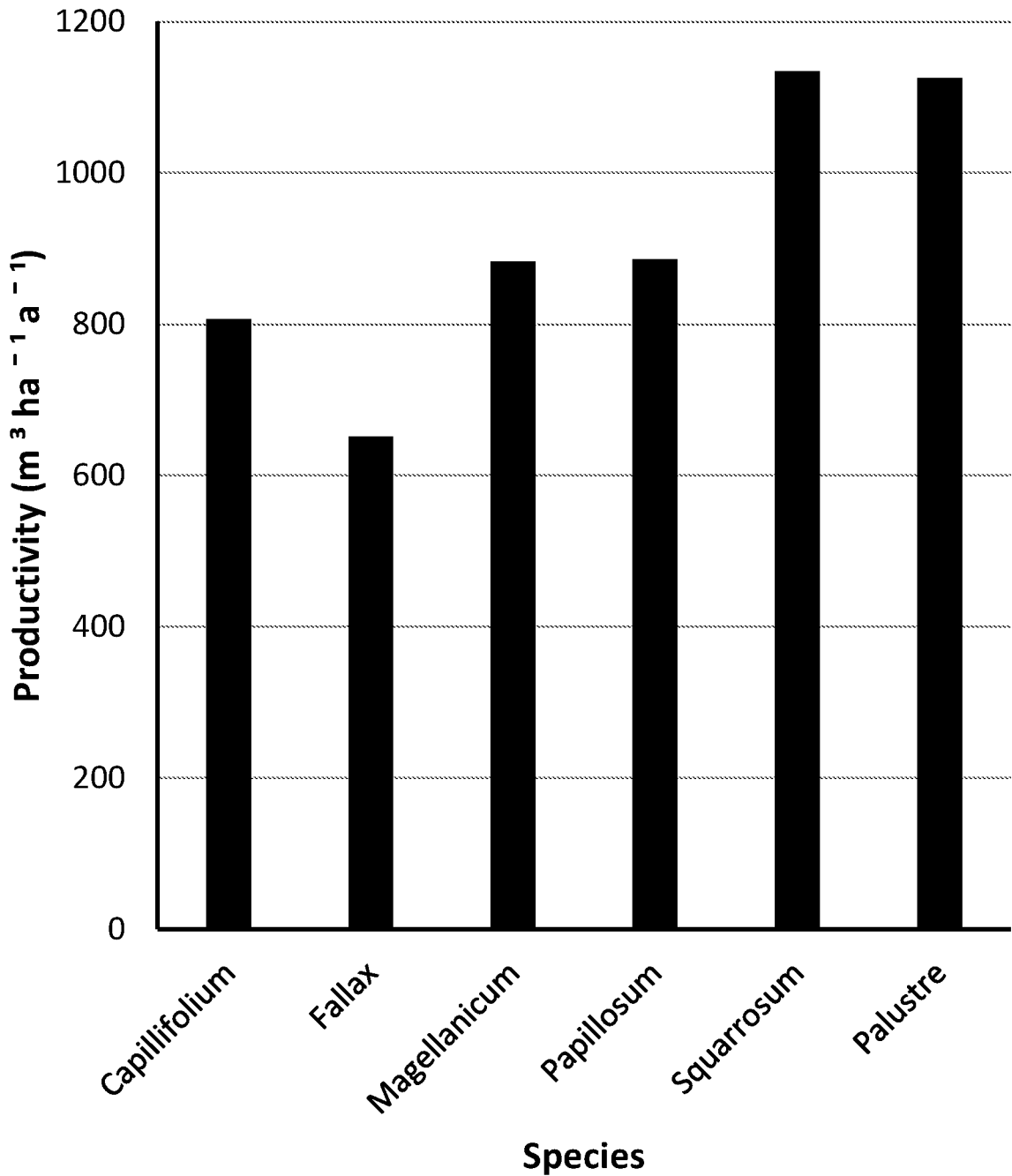
FIG. 8 shows productivity (in $m^3$ $ha^{-1}$ $a^{-1}$) of *Sphagnum* species grown under greenhouse conditions, as indicated.

FIG. 8 shows that *Sphagnum palustre* has a productivity of 1126 m$^3$ ha$^{-1}$ a$^{-1}$ in this trial, while *Sphagnum papillosum* has a similar productivity of 886 m$^3$ ha$^{-1}$ a$^{-1}$. *Sphagnum papillosum* has a higher productivity even than *Sphagnum fallax* (886 m$^3$ ha$^{-1}$ a$^{-1}$ for *Sphagnum papillosum* compared to 651 m$^3$ ha$^{-1}$ a$^{-1}$ for *Sphagnum fallax*).

Based on these results, it is technically credible that *Sphagnum papillosum* would have shown similar improved growth properties in the method of Example 2. Moreover, it would be expected that *Sphagnum papillosum* would perform better than *Sphagnum fallax* in the experiment the results of which are presented in FIG. 7. Thus, these data further demonstrate that the improvement in growth compared to conventional methods is applicable across the *Sphagnum* genus.

Example 4

Materials & Methods

*Sphagnum* was cultivated in accordance with a method of the present invention. In more detail, BeadaGel™ (commercially available from BeadaMoss®, UK) was spread at 3 l/m$^2$ on a peat surface of a field. *Sphagnum palustre* was used. Water was supplied with overhead (spray) irrigation (applied at 2.6 l/m$^2$ whenever the surface of the *Sphagnum* appeared dry). The water contained a nutrient composition comprising Hortifeeds NPK 15-5-15. This gave a final nutrient content comprising: 2.92 mg/L of sodium, 13.17 mg/L of magnesium, 106.50 mg/L of potassium, 36.96 mg/L of calcium, 0.41 mg/L of manganese, 0.09 mg/L of copper, 0.55 mg/L of zinc, 4.30 mg/L of sulfur, 0.19 mg/L of boron, 24.57 mg/L of phosphorus, 0.98 mg/L of iron, 0.05 mg/L of molybdenum, 0.16 mg/L of chloride, 0.00 mg/L of nitrite, 10.36 mg/L of sulphate, 378.62 mg/L of nitrate, and 17.36 mg/L of ammonium. Hortifeeds 15-5-15 is commercially available from Hortifeeds, UK. Growth was carried out for a period of 31 months before harvesting.

The harvest weight was measured, which is the wet weight of *Sphagnum* including the water it was holding. The dry weight was measured, which is the weight of *Sphagnum* once dried, without water. The dry weight was calculated after the *Sphagnum* had been heated until there was no further weight loss. This can be ensured by heating at 110° C. for 24 hours. The weight of water held by the *Sphagnum* is thus the difference in the harvest weight and the dry weight. Thus, the weight of water of the harvested *Sphagnum* was then calculated. The saturated weight of the *Sphagnum* was also measured by saturating the *Sphagnum* with water until it could hold no more water. The weight of the water of the saturated *Sphagnum* was then calculated. The ratios of the weight of water to the dry weight of *Sphagnum* were then calculated for the weight of water when the *Sphagnum* was harvested and the weight of water when the *Sphagnum* was saturated.

Results

The results are displayed below in Table 1. The maximum ratio achieved by saturating the *Sphagnum* is 43.80. A range of water content suitable for cultivation of *Sphagnum* may be expressed as a ratio of weight of water to dry weight of *Sphagnum* of between 5 and 60 (preferably less than 43.80) in order to cultivate the *Sphagnum* and to ensure that a surface of the *Sphagnum* remains in contact with air in order to permit gaseous exchange. In other words, the ratio is below saturation to facilitate growth and provide partial saturation. A preferred range is between 12 and 35.

TABLE 1

Ratios of weights compared to dry weights of *Sphagnum*.

| | |
|---|---|
| Harvest *Sphagnum* Weight/g | 104 |
| Dry *Sphagnum* Weight/g | 11.74 |
| Harvest Water Weight/g | 92.26 |
| Saturated *Sphagnum* Weight/g | 526 |
| Saturated Water Weight/g | 514.26 |
| Ratio Harvest Water Weight to Dry *Sphagnum* Weight | 7.86 |
| Ratio Saturated Water Weight to Dry *Sphagnum* Weight | 43.80 |

Example 5

Materials & Methods

*Sphagnum* was cultivated in accordance with a method of the present invention. In more detail, small plug-sized hummocks of *Sphagnum*, using BeadaHumok™ (commercially available from BeadaMoss®, UK) were planted in onto a bog grassland where the grass had been killed by herbicide and cultivation. *Sphagnum palustre* was used. BeadaHumok™ were planted by hand at a density of 30 units per m$^2$ and water was applied using an irrigation system to controllably irrigate the *Sphagnum* in accordance with the invention. Water was applied at 2.6 l/m$^2$ whenever the surface of the *Sphagnum* appeared dry. The water contained a nutrient composition comprising Hortifeeds NPK 15-5-15. This gave a final nutrient content comprising: 2.92 mg/L of sodium, 13.17 mg/L of magnesium, 106.50 mg/L of potassium, 36.96 mg/L of calcium, 0.41 mg/L of manganese, 0.09 mg/L of copper, 0.55 mg/L of zinc, 4.30 mg/L of sulfur, 0.19 mg/L of boron, 24.57 mg/L of phosphorus, 0.98 mg/L of iron, 0.05 mg/L of molybdenum, 0.16 mg/L of chloride, 0.00 mg/L of nitrite, 10.36 mg/L of sulphate, 378.62 mg/L of nitrate, and 17.36 mg/L of ammonium. Hortifeeds 15-5-15 is commercially available from Hortifeeds, UK. A trial was conducted using spray irrigation, and another trial was conducted using drip irrigation. Four replicate plots of size 2 m×2 m were used for each of the four treatments, under each of the irrigation systems. The treatments were 'no cover' and 3 different cover materials: straw (applied at 0.3 kg/m$^2$); perforated white plastic; and a very fine woven insect mesh of 0.3×0.7 mm 120 g/m$^2$. The initial size of the hummocks was measured and growth in terms of percentage increase in coverage area was assessed again two months later.

Results

Figure 9:
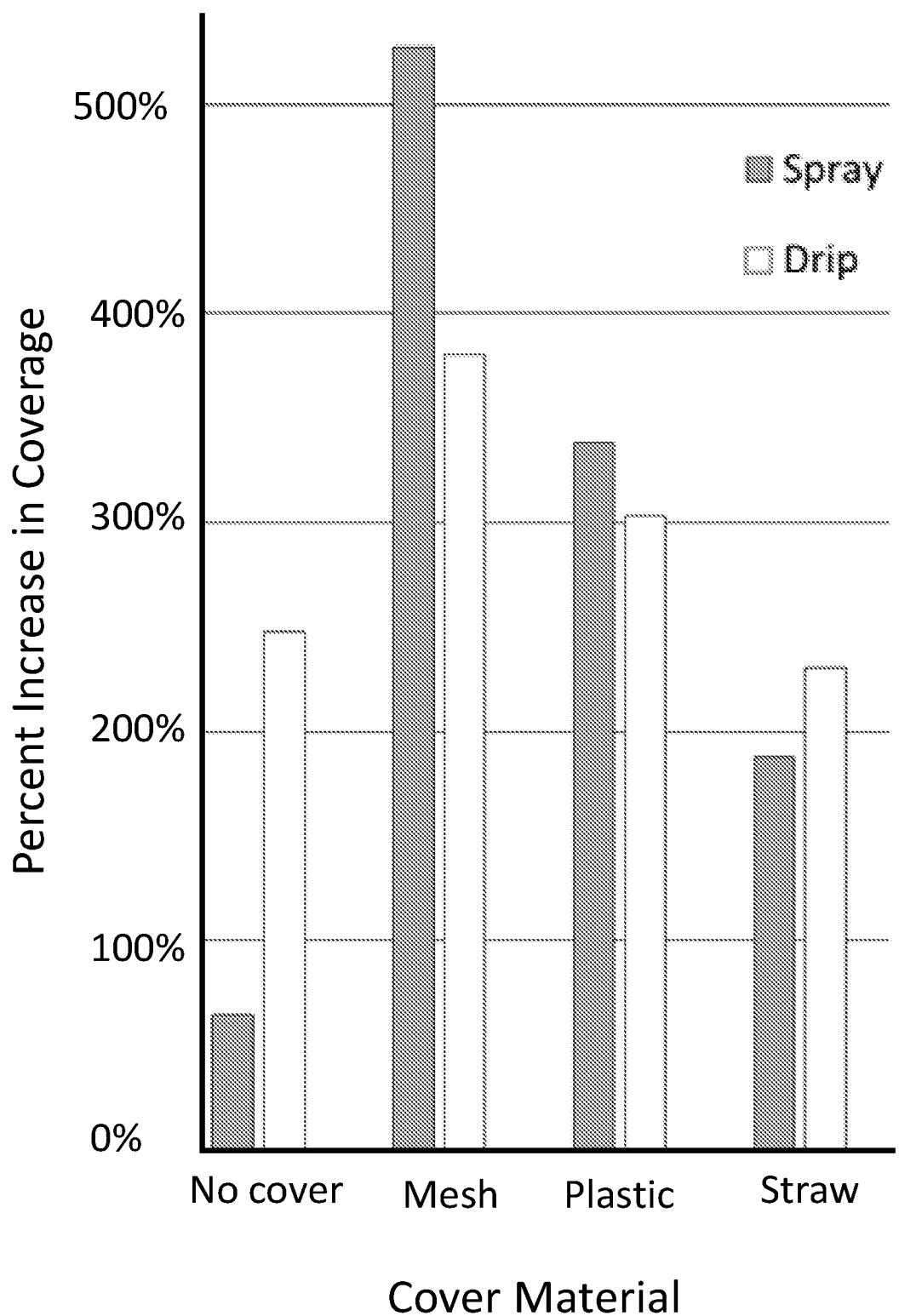
FIG. 9 shows the growth by percentage increase in coverage for *Sphagnum* grown with: no cover; a mesh cover; a plastic cover; or a straw cover. The irrigation method was via spray (grey bars) or drip irrigation (white bars).

FIG. 9 shows the percentage increase in area covered by each treatment over the two month period. The results for the spray irrigation system are shown in grey bars, while the results for the drip irrigation are shown in white bars. The data in FIG. 9 show that covering the *Sphagnum* with a cover improves growth. In particular, covering the *Sphagnum* with a mesh or plastic cover improves growth significantly, and using a mesh cover is particularly advantageous. The data in FIG. 9 show that using a woven mesh cover along with spray irrigation is particularly advantageous and leads to over a 500% increase in growth by coverage, while using no cover provides only approximately 60% increase in growth by coverage for spray irrigation.

Example 6

Materials & Methods

*Sphagnum* was applied to a peat surface and a peat surface with a fleece cover and grown under the same conditions. *Sphagnum* was cultivated in accordance with a method of the present invention. In more detail, BeadaGel™ (commercially available from BeadaMoss®, UK) was spread at 3 l/m$^2$ on a peat surface of a field. The species used was *Sphagnum capillifolium*. Water was supplied with overhead (spray) irrigation (applied at 2.6 l/m$^2$ whenever the surface of the *Sphagnum* appeared dry). The water contained a nutrient composition comprising Hortifeeds NPK 15-5-15. This gave a final nutrient content comprising: 2.92 mg/L of sodium, 13.17 mg/L of magnesium, 106.50 mg/L of potassium, 36.96 mg/L of calcium, 0.41 mg/L of manganese, 0.09 mg/L of copper, 0.55 mg/L of zinc, 4.30 mg/L of sulfur, 0.19 mg/L of boron, 24.57 mg/L of phosphorus, 0.98 mg/L of iron, 0.05 mg/L of molybdenum, 0.16 mg/L of chloride, 0.00 mg/L of nitrite, 10.36 mg/L of sulphate, 378.62 mg/L of nitrate, and 17.36 mg/L of ammonium. Hortifeeds 15-5-15 is commercially available from Hortifeeds, UK. Growth was carried out for a period of 43 weeks.

Results

Figure 10:
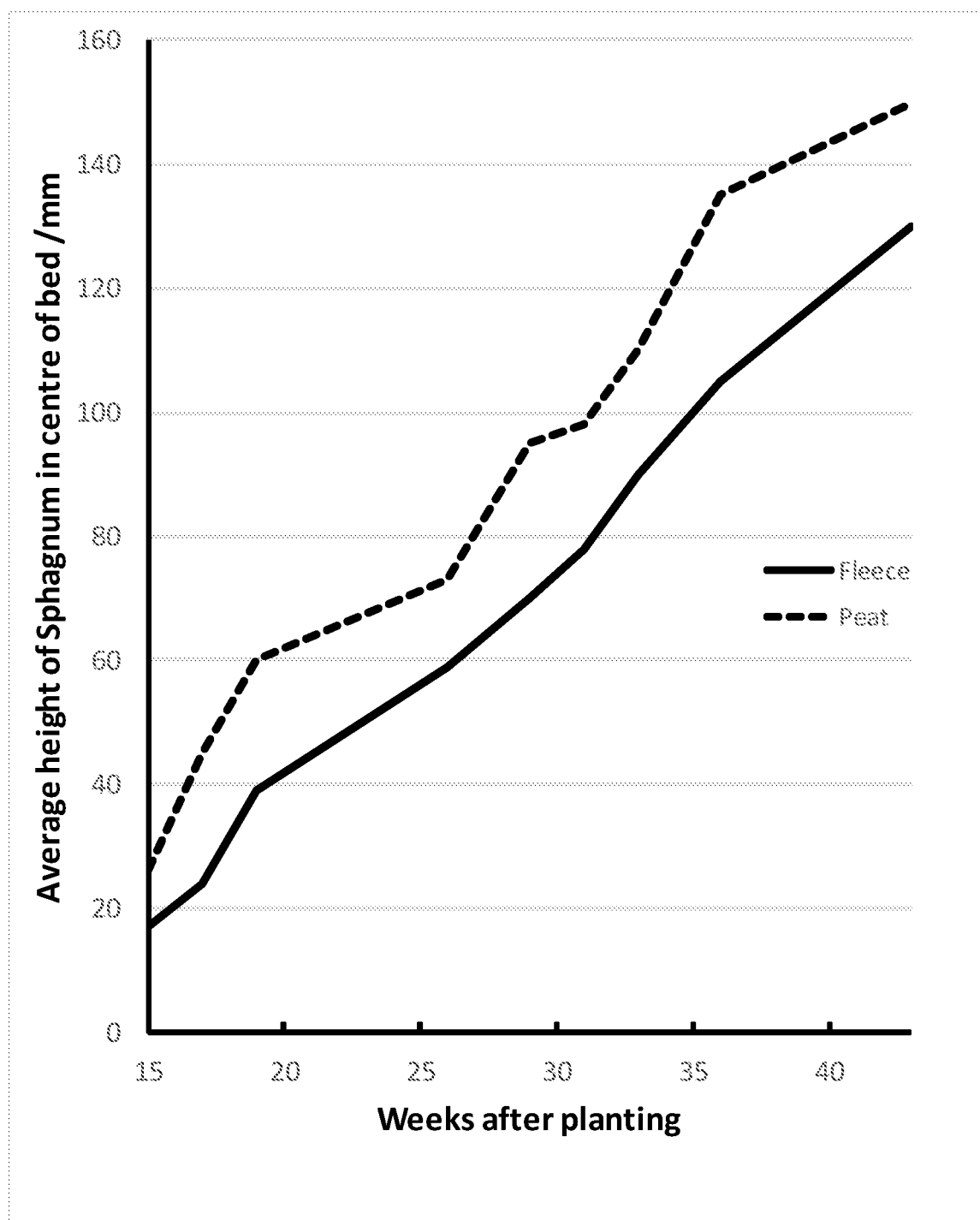
FIG. 10 shows average height of *Sphagnum* in a centre of a growing bed (in mm) over time when *Sphagnum* was grown on either a fleece surface (solid line) or a peat surface (dashed line).

FIG. 10 shows that cultivation on a peat surface lead to improved *Sphagnum* growth when compared to a fleece surface (e.g. as used conventionally for growing *Sphagnum* on water bodies on 'floating mats'). Thus, it was concluded that growing *Sphagnum* on a surface of a field was optimal.

Example 7

Materials & Methods

*Sphagnum palustre* was cultivated in accordance with a method of the present invention. In more detail, *Sphagnum* was applied onto a field with peatland soil, and a field with organo-mineral soil. *Sphagnum palustre* was used. Water was applied using an irrigation system to controllably irrigate the *Sphagnum* in accordance with the invention. Water was applied at 2.6 l/m$^2$ whenever the surface of the *Sphagnum* appeared dry. The water contained a nutrient composition comprising Hortifeeds NPK 15-5-15. This gave a final nutrient content comprising: 2.92 mg/L of sodium, 13.17 mg/L of magnesium, 106.50 mg/L of potassium, 36.96 mg/L of calcium, 0.41 mg/L of manganese, 0.09 mg/L of copper, 0.55 mg/L of zinc, 4.30 mg/L of sulfur, 0.19 mg/L of boron, 24.57 mg/L of phosphorus, 0.98 mg/L of iron, 0.05 mg/L of molybdenum, 0.16 mg/L of chloride, 0.00 mg/L of nitrite, 10.36 mg/L of sulphate, 378.62 mg/L of nitrate, and 17.36 mg/L of ammonium. Hortifeeds 15-5-15 is commercially available from Hortifeeds, UK. Irrigation was applied using spray irrigation and drip irrigation. The treatments were 'no cover' and 3 different cover materials: straw (applied at 0.3 kg/m$^2$); perforated white plastic; and a very fine woven insect mesh of 0.3×0.7 mm 120 g/m$^2$. The *Sphagnum* was cultivated for 18 months, and the coverage of the *Sphagnum* for each treatment was observed. The coverage of *Sphagnum* over the area was measured as a percentage cover at intervals over a 7 month period. The greenhouse gas balance was measured in intervals to determine when net zero and sequestration were achieved.

Results

Figure 11:
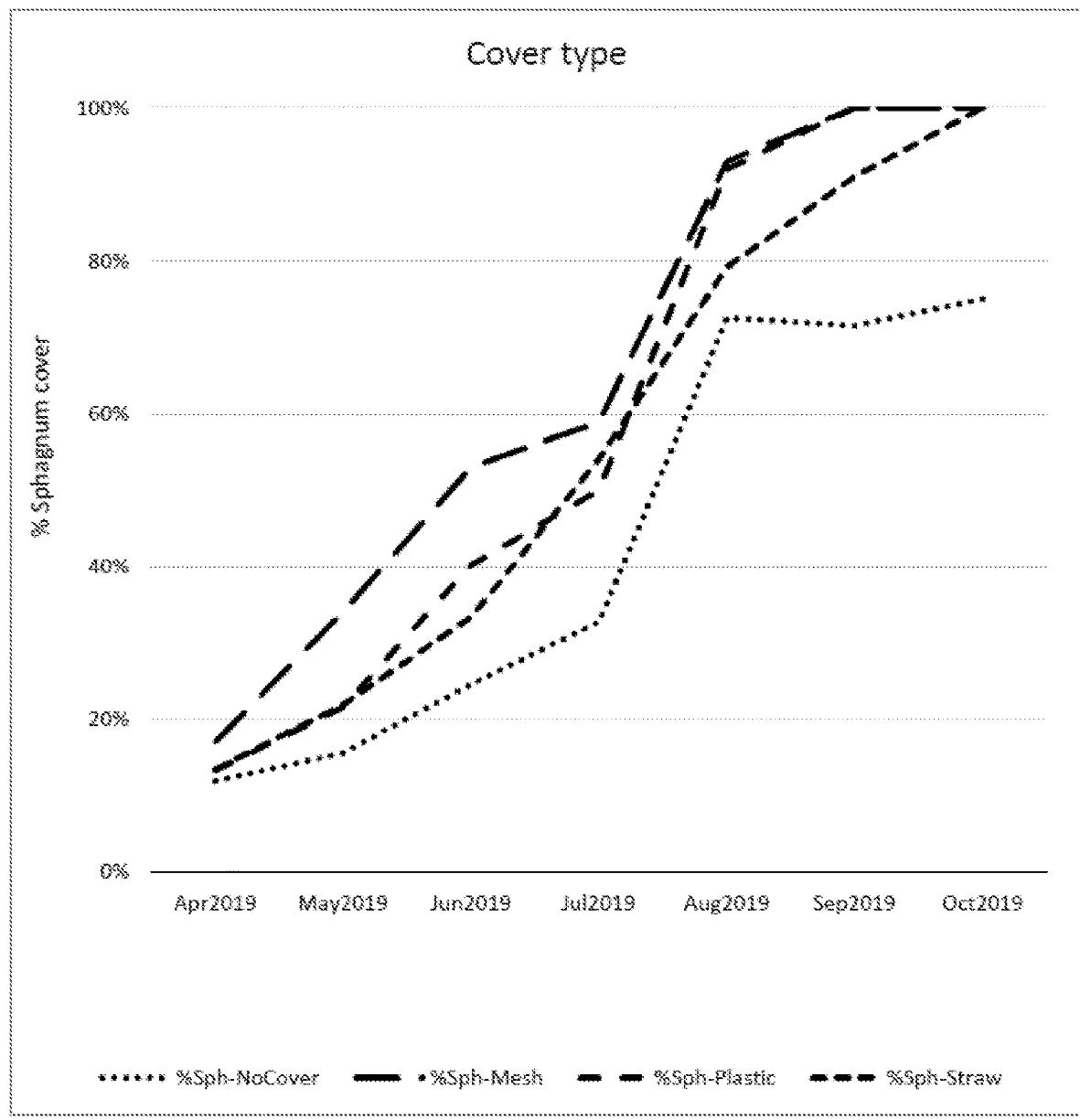
FIG. 11 shows a percentage coverage for *Sphagnum* grown on a peatland field with: no cover; a mesh cover; a plastic cover; or a straw cover.
Figure 12:
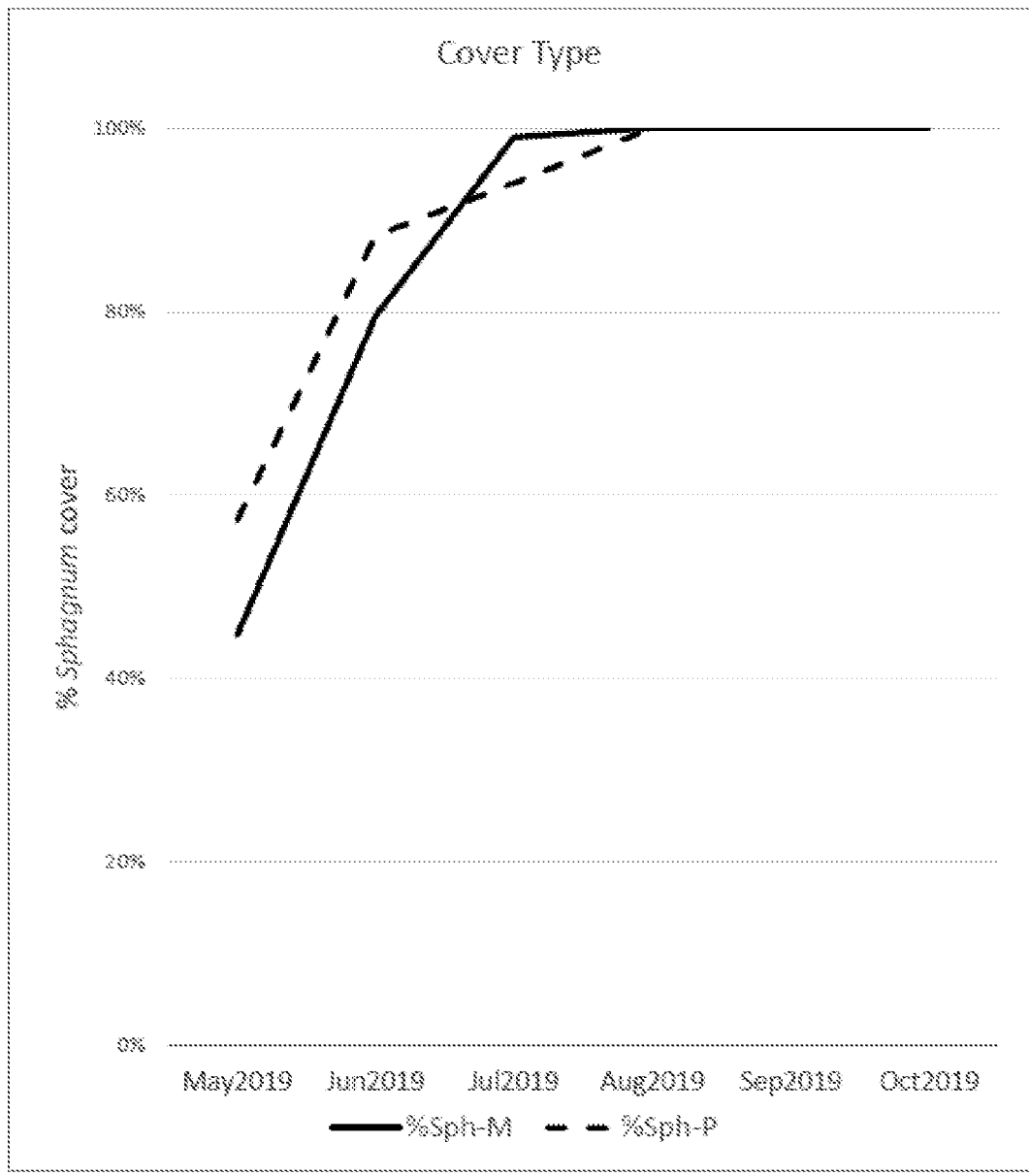
FIG. 12 shows a percentage coverage for *Sphagnum* grown on an organo-mineral field with: a mesh cover; or a plastic cover.

FIG. 11 shows the percentage coverage of *Sphagnum* for the peatland field trial. FIG. 12 shows the percentage coverage of *Sphagnum* for the organo-mineral field trial. FIGS. 11 and 12 show that each of the covers provided better growth than no cover.

As shown in FIGS. 11 and 12, providing a plastic cover achieved significantly better results than no cover, and better results than straw.

In the peatland trial, the *Sphagnum* with the plastic cover was observed to be greener than no cover or straw, and this was believed to be due to the shading effect of the plastic. Establishment was very good, and 100% coverage was achieved after 9-10 months. Observed growth under hot and dry conditions was particularly good due to the shading and good humidity and water retention. Weed ingress was much less than straw and no cover. In the organo-mineral trial, in FIG. 12, 100% coverage was achieved in 10-12 months.

As shown in FIGS. 11 and 12, providing a mesh cover achieved significantly better results than no cover, better results than straw, and even better results than a plastic cover.

In the peatland trial, the *Sphagnum* with the mesh cover performed similarly to the plastic cover but with faster establishment. Weed ingress was much lower than no cover and straw, and similar to the plastic cover. The mesh was far more robust than the plastic cover, and did not deteriorate, even over the 18 month period. Therefore, the mesh cover does not need replacing, providing a significant advantage, especially on large scale sites. Meanwhile, the mesh was observed to perform well under low light levels. In the organo-mineral trial, the establishment was excellent, and the growth was superior to other treatments.

Both the plastic and the mesh covers achieved a greenhouse gas balance (net zero) within 9 months after application, and provided significant sequestration in 10 months. This provides a dramatic effect for *Sphagnum* farming, and shows the advantages of such covers compared to no cover.

The two irrigation systems (drip and spray) were also compared on the different sites (peatland and organo-mineral). Drip irrigation was found to perform well on organo-mineral soil as this was relatively impermeable compared to peatland (i.e. not cracked), and so the water was able to spread over the surface without soaking into the soil, reducing wastage. During periods of irrigation interruption, the water on the surface acted as an extra buffer which provided an advantage.

Spray irrigation performed better on peatland soil as this was very permeable. The drip irrigation led to large water losses on permeable soil, which meant the spray system was more efficient and resulted in better growth for the same amount of water applied. The spray irrigation kept the *Sphagnum* sufficiently moist at the growing points (capitula at the top of the *Sphagnum*) without use of excessive amounts of water because the irrigation was supplied from above to the upper surface of the *Sphagnum*. The spray irrigation also does not rely on capillary action from the surface of the field to the top of the *Sphagnum* (e.g. capitula), meaning that water supply and thus growth does not deteriorate when the *Sphagnum* becomes taller and capillary action becomes less efficient over the larger distance.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in agriculture, horticulture, and plant technology or related fields are intended to be within the scope of the following claims.

The invention claimed is:

1. A method for cultivating *Sphagnum* that has been applied to a surface of a field having a water table, the method comprising controllably irrigating the *Sphagnum*, wherein the controllably irrigating comprises one or more of applying water to a surface of the *Sphagnum* and applying water to the surface of the field;
    wherein the controllably irrigating is carried out for a period of at least 3 months;
    wherein the controllably irrigating does not saturate with water a portion of the field below the surface of the field for the period, the portion having a height of at least 20 cm; and
    wherein the controllably irrigating comprises applying water to maintain a ratio of a weight of water held by the *Sphagnum* to a dry weight of the *Sphagnum* between 8:1 and 45:1 for the period.

2. The method according to claim 1, wherein the controllably irrigating comprises applying water from above the *Sphagnum*.

3. The method according to claim 1, wherein the controllably irrigating comprises spray irrigation.

4. The method according to claim 1, wherein the controllably irrigating comprises drip irrigation.

5. The method according to claim 2, wherein the controllably irrigating does not comprise saturating the field with water to submerge at least a portion of the *Sphagnum* with water.

6. The method according to claim 2, wherein the controllably irrigating comprises applying between 3.5 and 35 L of water per m$^2$ per week.

7. The method according to claim 2, wherein a weight of water to a dry weight of the *Sphagnum* are in a ratio between 10:1 and 40:1.

8. The method according to claim 2, wherein a weight of water to a dry weight of the *Sphagnum* are in a ratio of between 12:1 and 35:1.

9. The method according to claim 2, wherein the controllably irrigating ensures that at least a portion of the surface of the *Sphagnum* remains in contact with air in order to permit gaseous exchange.

10. The method according to claim 2, further comprising covering the *Sphagnum*.

11. The method according to claim 10, wherein a mesh cover is applied to the *Sphagnum*.

12. The method according to claim 2, further comprising harvesting the *Sphagnum*.

13. The method according to claim 12, further comprising providing a growing medium comprising the harvested *Sphagnum*.

14. The method according to claim 1, wherein the controllably irrigating maintains the level of the water table below 20 cm from the surface of the field for the period of at least 3 months.

15. The method according to claim 1, wherein for a period of at least 6 months, the controllably irrigating does not raise the level of the water table to within 20 cm from the surface of the field.

16. The method according to claim 1, wherein for a period of at least 1 year, the controllably irrigating does not raise the level of the water table to within 20 cm from the surface of the field.

17. The method according to claim 1, wherein for a period of at least 1 month, the controllably irrigating does not raise the level of the water table to within 50 cm from the surface of the field.

18. The method according to claim 1, wherein for a period of at least 1 month, the controllably irrigating does not raise the level of the water table to within 75 cm from the surface of the field.

19. A method for cultivating *Sphagnum* that has been applied to a surface of a field having a water table, the method comprising controllably irrigating the *Sphagnum*;
    wherein the controllably irrigating comprises one or more of applying water to a surface of the *Sphagnum* and applying water to the surface of the field;
    wherein the controllably irrigating is carried out for a period of at least 3 months; and
    wherein the controllably irrigating does not saturate with water a portion of the field below the surface of the field for the period, the portion having a height of at least 20 cm.

20. A method for cultivating *Sphagnum* that has been applied to a surface of a field having a water table, the method comprising controllably irrigating the *Sphagnum*;
    wherein the controllably irrigating comprises one or more of applying water to a surface of the *Sphagnum* and applying water to the surface of the field;
    wherein the controllably irrigating is carried out for a period of at least 1 month; and
    wherein the controllably irrigating does not saturate with water a portion of the field below the surface of the field for the period, the portion having a height of at least 50 cm.

* * * * *